US008239906B2

(12) United States Patent
Kim et al.

(10) Patent No.: US 8,239,906 B2
(45) Date of Patent: Aug. 7, 2012

(54) IPTV RECEIVER AND A METHOD OF MANAGING VIDEO FUNCTIONALITY AND VIDEO QUALITY ON A SCREEN IN THE IPTV RECEIVER

(75) Inventors: Kyung Ho Kim, Seoul (KR); Jong Yeul Suh, Seoul (KR); Chang Hoon Kim, Seongnam-si (KR); Joon Hui Lee, Seoul (KR); Jin Pil Kim, Seoul (KR); Seok Joo Lee, Seoul (KR); Hyeong Ho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 12/654,861

(22) Filed: Jan. 6, 2010

(65) Prior Publication Data
US 2010/0180314 A1    Jul. 15, 2010

Related U.S. Application Data

(60) Provisional application No. 61/142,639, filed on Jan. 6, 2009.

(51) Int. Cl.
*H04N 7/173* (2011.01)
(52) U.S. Cl. .......... 725/110; 725/107; 725/131; 714/43; 714/47.1
(58) Field of Classification Search ................. 725/107, 725/110, 131; 714/43, 47.1
See application file for complete search history.

(56) References Cited

U.S. PATENT DOCUMENTS

| | | | |
|---|---|---|---|
| 8,032,918 B2 * | 10/2011 | Seidel et al. .................. | 725/141 |
| 2007/0124766 A1 * | 5/2007 | Relan et al. .................... | 725/38 |
| 2007/0250846 A1 * | 10/2007 | Swix et al. ..................... | 725/10 |
| 2008/0235728 A1 * | 9/2008 | Kim ................................ | 725/39 |
| 2009/0172746 A1 * | 7/2009 | Aldrey et al. .................. | 725/61 |
| 2009/0276805 A1 * | 11/2009 | Andrews Ii et al. ........... | 725/35 |
| 2009/0300677 A1 * | 12/2009 | Zalewski ........................ | 725/38 |
| 2010/0053337 A1 * | 3/2010 | Kirk et al. ..................... | 348/181 |
| 2010/0115541 A1 * | 5/2010 | Schein et al. .................. | 725/14 |

FOREIGN PATENT DOCUMENTS

| | | |
|---|---|---|
| JP | 2007114402 | 5/2007 |
| KR | 20080023891 | 3/2008 |
| KR | 20080086765 | 9/2008 |

* cited by examiner

*Primary Examiner* — Pankaj Kumar
*Assistant Examiner* — Mulugeta Mengesha
(74) *Attorney, Agent, or Firm* — McKenna Long & Aldridge LLP

(57) ABSTRACT

An IPTV receiver and a method for managing video functionality and video quality on a screen in the IPTV receiver are disclosed. Herein, a method includes downloading a widget application from a server, executing the downloaded widget application at a browser, requesting a video test stream through the executed widget application to the server and managing the video functionality and the video quality on the screen using the video test stream.

19 Claims, 20 Drawing Sheets

FIG. 6

```xml
<xs:complexType name="tUEProfile">
  <xs:sequence>
    <xs:element name="UserEquipmentID" type="ns1:tUEID"/>
    <xs:element name="UserEquipmentClass" type="ns1:tUserEquipmentClass"/>
    <xs:element name="Resolution" type="ns1:tResolution" minOccurs="0"/>
    <xs:element name="SupportedEncodings" type="ns1:tSupportedEncodings" minOccurs="0" maxOccurs="unbounded"/>
    <xs:element name="IPEncapsulations" type="ns1:tIPEncapsulations" minOccurs="0" maxOccurs="unbounded"/>
    <xs:element name="Extension" type="ns1:tExtension" minOccurs="0"/>
    <xs:any namespace="##other" processContents="lax" minOccurs="0" maxOccurs="unbounded"/>
    <xs:element name="GraphicResolution" type="ns1:tGraphicResolution" minOccurs="0"/>
    <xs:element name="GraphicColors" type="ns1:tGraphicColors" minOccurs="0"/>
    <xs:element name="AvailableResources" type="ns1:tAvailableResources" minOccurs="0"/>
    <xs:element name="SupportedFilters" type="ns1:tSupportedFilters" minOccurs="0"/>
  </xs:sequence>
</xs:complexType>
<xs:complexType name="tGraphicColors">
  <xs:attribute name="colorDepth">
    <xs:simpleType>
      <xs:restriction base="xs:string">
        <xs:enumeration value="32bpp"/>
        <xs:enumeration value="24bpp"/>
        <xs:enumeration value="16bpp"/>
        <xs:enumeration value="8bpp"/>
        <xs:enumeration value=""/>
      </xs:restriction>
    </xs:simpleType>
  </xs:attribute>
</xs:complexType>
<xs:complexType name="tGraphicResolution">
  <xs:attribute name="HorizontalSize" type="xs:integer"/>
  <xs:attribute name="VerticalSize" type="xs:integer"/>
  <xs:attribute name="Rotate" type="xs:boolean"/>
</xs:complexType>
<xs:complexType name="tAvailableResources">
<xs:sequence>
    <xs:element name="nonVolatileMemory" type="xs:unsignedInt" minOccurs="0"/>
    <xs:element name="VolatileMemory" type="xs:unsignedInt" minOccurs="0"/>
  </xs:sequence>
</xs:complexType>
<xs:complexType name="tSupportedFilters">
  <xs:sequence>
    <xs:element name="sharpness" type="xs:string" minOccurs="0"/>
    <xs:element name="blur" type="xs:string" minOccurs="0"/>
    <xs:element name="contrast" type="xs:string" minOccurs="0"/>
    <xs:element name="smoothness" type="xs:string" minOccurs="0"/>
    <xs:element name="brightness" type="xs:string" minOccurs="0"/>
    <xs:element name="gamma" type="xs:string" minOccurs="0"/>
    <xs:element name="temperature" type="xs:string" minOccurs="0"/>
  </xs:sequence>
</xs:complexType>
```

FIG. 9

```
<complexType name="DeviceInfoType">
 <sequence>
  <element name="Manufacturer">
   <simpleType>
    <restriction base="string"><maxLength value="64"/></restriction>
   </simpleType>
  </element>
  <element name="ManufacturerOUI">
   <simpleType>
    <restriction base="string"><maxLength value="6"/></restriction>
   </simpleType>
  </element>
  <element name="ModelName">
   <simpleType>
    <restriction base="string"><maxLength value="64"/></restriction>
   </simpleType>
  </element>
  <element name="Description">
   <simpleType>
    <restriction base="string"><maxLength value="256"/></restriction>
   </simpleType>
  </element>
  <element name="ProductClass">
   <simpleType>
    <restriction base="string"><maxLength value="64"/></restriction>
   </simpleType>
```

```
  </element>
  <element name="SerialNumber">
   <simpleType>
    <restriction base="string"><maxLength value="64"/></restriction>
   </simpleType>
  </element>
  <element name="HardwareVersion">
   <simpleType>
    <restriction base="string"><maxLength value="64"/></restriction>
   </simpleType>
  </element>
  <element name="SoftwareVersion">
   <simpleType>
    <restriction base="string"><maxLength value="64"/></restriction>
   </simpleType>
  </element>
  <element name="EnabledOptions">
   <simpleType>
    <restriction base="string"><maxLength value="1024"/></restriction>
   </simpleType>
  </element>
  <element name="AdditionalHardwareVersion">
   <simpleType>
    <restriction base="string"><maxLength value="64"/></restriction>
   </simpleType>
  </element>
```

FIG. 10

```
<element name="AdditionalSoftwareVersion">
  <simpleType>
    <restriction base="string"><maxLength value="64"/></restriction>
  </simpleType>
</element>
<element name="ProvisioningCode">
  <simpleType>
    <restriction base="string"><maxLength value="64"/></restriction>
  </simpleType>
</element>
<element name="DeviceStatus">
  <simpleType>
    <restriction base="string">
      <enumeration value="Up"/>
      <enumeration value="Initializing"/>
      <enumeration value="Error"/>
      <enumeration value="Disabled"/>
    </restriction>
  </simpleType>
</element>
```

```
</element>
<element name="Uptime" type="unsignedInt"/>
<element name="FirstUseDate" type="dateTime"/>
<element name="DeviceLog">
  <simpleType>
    <restriction base="string">
      <maxLength value="32768"/>
    </restriction>
  </simpleType>
</element>
<element name="AvailableResources" type="rc:AvailableResourcesType"/>
</sequence>
</complexType>
<complexType name="AvailableResourcesType">
  <sequence>
    <element name="nonVolatileMemory" type="unsignedInt" minOccurs="0"/>
    <element name="VolatileMemory" type="unsignedInt" minOccurs="0"/>
  </sequence>
</complexType>
```

FIG. 12

```xml
<complexType name="STBServiceCapabilitiesType">
  <sequence>
    <element name="FrontEnd" type="rc:FrontEndType"/>
    <element name="PVR" type="rc:PVRType"/>
    <element name="AudioDecoder" type="rc:AudioDecoderType"/>
    <element name="VideoDecoder" type="rc:VideoDecoderType"/>
    <element name="AudioOutput" type="rc:AudioOutputType"/>
    <element name="VideoOutput" type="rc:VideoOutputType"/>
    <element name="CA" type="rc:CAType"/>
    <element name="DRM" type="rc:DRMType"/>
    <element name="ServiceMonitoring" type="rc:ServiceMonitoringType"/>
    <element name="AudienceStats" type="rc:AudienceStatsType"/>
    <element name="Graphic" type="rc:GraphicType"/>
    <element name="SupportedFilters" type="rc:SupportedFiltersType"/>
  </sequence>
  <attribute name="MaxActiveAVStreams" type="rc:MaximumNumberType"/>
  <attribute name="MaxActiveAVPlayers" type="rc:MaximumNumberType"/>
</complexType>
<annotation>
  <documentation>STBServiceType</documentation>
</annotation>
<complexType name="STBServiceType">
  <sequence>
    <element name="Capabilities" type="rc:STBServiceCapabilitiesType" maxOccurs="unbounded"/>
  </sequence>
</complexType>
<complexType name="GraphicColorsType">
  <attribute name="colorDepth">
    <simpleType>
      <restriction base="string"/>
    </simpleType>
  </attribute>
</complexType>
<complexType name="GraphicResolutionType">
  <attribute name="HorizontalSize" type="integer"/>
  <attribute name="VerticalSize" type="integer"/>
  <attribute name="Rotate" type="boolean"/>
</complexType>
<complexType name="GraphicType">
  <sequence>
    <element name="GraphicResolution" type="rc:GraphicResolutionType"/>
    <element name="GraphicColor" type="rc:GraphicColorsType"/>
  </sequence>
</complexType>
<complexType name="SupportedFiltersType">
  <sequence>
    <element name="sharpness" type="string" minOccurs="0"/>
    <element name="blur" type="string" minOccurs="0"/>
    <element name="contrast" type="string" minOccurs="0"/>
    <element name="smoothness" type="string" minOccurs="0"/>
    <element name="brightness" type="string" minOccurs="0"/>
    <element name="gamma" type="string" minOccurs="0"/>
    <element name="temperature" type="string" minOccurs="0"/>
  </sequence>
</complexType>
```

FIG. 14

```
<xs:complexType name="tUEProfile">
  <xs:sequence>
    <xs:element name="UserEquipmentID" type="ns1:tUEID"/>
    <xs:element name="UserEquipmentClass" type="ns1:tUserEquipmentClass"/>
    <xs:element name="Resolution" type="ns1:tResolution" minOccurs="0"/>
    <xs:element name="SupportedEncodings" type="ns1:tSupportedEncodings" minOccurs="0" maxOccurs="unbounded"/>
    <xs:element name="IPEncapsulations" type="ns1:tIPEncapsulations" minOccurs="0" maxOccurs="unbounded"/>
    <xs:element name="Extension" type="ns1:tExtension" minOccurs="0"/>
    <xs:any namespace="##other" processContents="lax" minOccurs="0" maxOccurs="unbounded"/>
    <xs:element name="GraphicResolution" type="ns1:tGraphicResolution" minOccurs="0"/>
    <xs:element name="GraphicColors" type="ns1:tGraphicColors" minOccurs="0"/>
    <xs:element name="AvailableResources" type="ns1:tAvailableResources" minOccurs="0"/>
    <xs:element name="SupportedFilters" type="ns1:tSupportedFilters" minOccurs="0"/>
    <xs:element name="ApplicationSettings" type="ns1:tApplicationSetting" minOccurs="0" maxOccurs="unbounded"/>
  </xs:sequence>
</xs:complexType>
<xs:complexType name="tApplicationSetting">
  <xs:sequence>
    <xs:element name="ApplicationID" type="xs:string" minOccurs="0"/>
    <xs:element name="RevisionNumber" type="xs:string" minOccurs="0"/>
    <xs:element name="Settings" minOccurs="0">
      <xs:complexType>
        <xs:sequence>
          <xs:element name="Position" type="xs:unsignedInt" minOccurs="0"/>
          <xs:element name="Extension" type="ns1:tExtension" minOccurs="0"/>
          <xs:any namespace="##other" processContents="lax" minOccurs="0" maxOccurs="unbounded"/>
        </xs:sequence>
      </xs:complexType>
    </xs:element>
  </xs:sequence>
</xs:complexType>
```

IPTV RECEIVER AND A METHOD OF MANAGING VIDEO FUNCTIONALITY AND VIDEO QUALITY ON A SCREEN IN THE IPTV RECEIVER

This application further claims the benefit of U.S. Provisional Application No. 61/142,639, filed on Jan. 6, 2009, which is hereby incorporated by reference.

BACKGROUND OF THE INVENTION

1. Field of the Invention

The present invention relates to an Internet Protocol Television (IPTV) service, and more particularly, to a method for managing video functionality and video quality on a screen in an IPTV receiver, and the IPTV receiver.

2. Discussion of the Related Art

Conventional broadcast receivers received broadcast signals from a broadcasting medium, such as terrestrial, satellite, and cable, thereby providing the broadcast signals to users. Recently, however, Internet Protocol Television (IPTV) services enabling the reception and transmission of broadcast signals in Internet Protocol (IP) packets via IP are being actively provided. Unlike other broadcasting media, such IPTV services are free from all geographical limitations. More specifically, once a user is connected to an IP, the user may be provided with the requested IPTV services.

There are two types of IPTV receivers, an IPTV set with an IPTV and a display in combination and an IPTV set-top box having an IPTV reception part only. Many types of displays are available. In case of the IPTV set-top box, especially a test for determining whether video configuration and video functionality are normal and a video quality test are required. Conventionally, a test environment that enables fine video adjustment according to users' tastes has not been built, thus causing user inconvenience. Moreover, a conventional test environment has limitations in applying to both a stand-alone IPTV receiver and an IPTV set including an IPTV receiver and a display in combination.

SUMMARY OF THE INVENTION

Accordingly, the present invention is directed to a method for controlling a video management widget application and an Internet Television (IPTV) receiver that substantially obviates one or more problems due to limitations and disadvantages of the related art.

An object of the present invention is to provide a method for helping a user to optimize video quality by a periodical test of a video output device in a display device. For example, since a video configuration changes in some cases when the user views a movie, the user may not enjoy the movie normally.

Another object of the present invention is to provide a method for enabling fine video adjustment when a user needs.

A further object of the present invention is to provide a method for providing a video test stream for checking video functionality from a remote controller to an IPTV receiver by a manufacturer so that a user may adjust video quality or check video connectivity and configuration on his own using the video test stream.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method includes downloading a widget application from a server, executing the downloaded widget application at a browser, requesting a video test stream through the executed widget application to the server and managing the video functionality and the video quality on the screen using the video test stream.

At this time, the video test stream may be received through a connected Internet Protocol in real-time.

And, the video test stream may be downloaded from the server.

Also, the method may further comprise receiving a user's input associated with managing video functionality and video quality on the screen.

And, the method may further comprise storing the received video test stream and reproducing the stored video test stream.

Also, the method may further comprise transmitting a result of managing the video functionality and the video quality on the screen to the server.

And, the video test stream may be used to test a plurality of pattern types, the plurality of patter types including a vertical resolution pattern, a vertical resolution pattern with motion, a vertical resolution with motion and 3:2 pulldown pattern, a colorbar pattern, an overscan and a pixel crop pattern.

Also, the method may further comprise performing an operation corresponding to the called Application Programming Interface (API), when the executed widget application calls a specific API.

And, the video test stream includes a Moving Picture Experts Group-2 (MPEG-2) Transport Stream (TS) or an MPEG-4 TS in order to test video quality.

In another aspect of the present invention, an IPTV receiver includes a receiving unit for downloading a widget application from a server, a widget processor for executing the downloaded widget application at a browser and requesting a video test stream through the executed widget application to the server and a controller for controlling the video functionality and the video quality on the screen to be managed using the video test stream according to a user's input.

At this time, the widget processor may receive the video test stream through a connected Internet Protocol in real-time.

Also, the widget processor may download the video test stream from the server.

And, the receiving unit may receive a request for selecting an area on the screen to test video quality from the user.

Also, the IPTV receiver may further comprise a storage unit for storing the received video test stream.

And, the controller may control the stored video test stream to reproduce.

Also, the controller may control a result of managing the video functionality and the video quality on the screen to transmit to the server.

And, the received video test stream may be used to test a plurality of pattern types, the plurality of patter types including a vertical resolution pattern, a vertical resolution pattern with motion, a vertical resolution with motion and 3:2 pulldown pattern, a colorbar pattern, an overscan and a pixel crop pattern.

Also, when the executed widget application calls a specific Application Programming Interfaces (APIs), the widget processor may request the controller to perform an operation corresponding to the called API.

And, the video test stream may include a Moving Picture Experts Group-2 (MPEG-2) Transport Stream (TS) or an MPEG-4 TS in order to test video quality.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a diagram showing an XML schema of FIG. 5;

FIG. 9 and FIG. 10 illustrate a diagram showing an XML schema of FIG. 8;

FIG. 12 illustrates a diagram showing an XML schema of FIG. 11;

FIG. 14 illustrates a diagram showing an XML schema of FIG. 13;

DETAILED DESCRIPTION OF THE INVENTION

Figure 1:
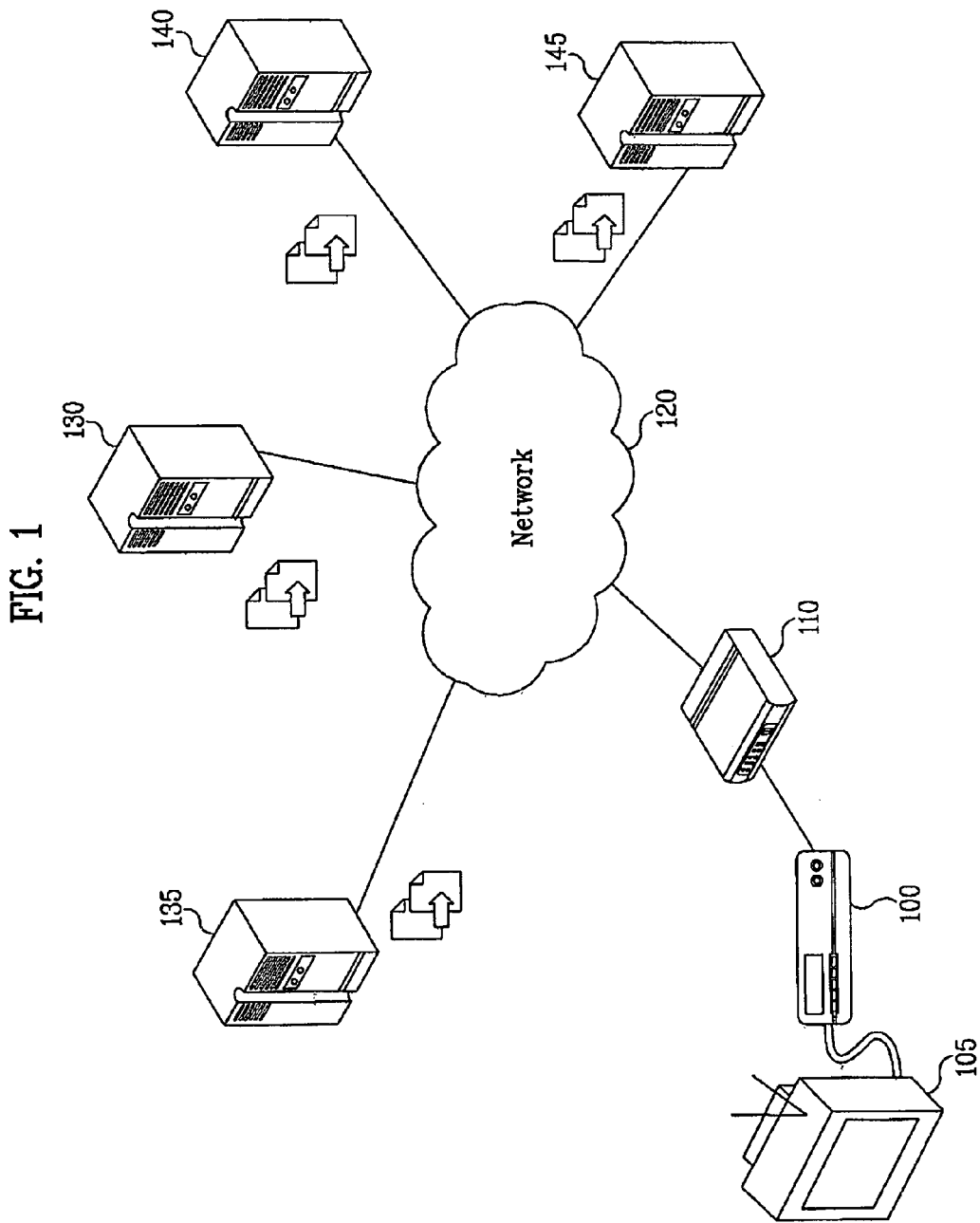
FIG. 1 illustrates a general view describing an IPTV environment that can provide a widget service according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Hereinafter, preferred embodiments of the IPTV receiver and method for controlling an application in the IPTV receiver according to the present invention will now be described in detail with reference to the following drawings. Hereinafter, in the description of the present invention, the term "video management widget application" will refer to an application, which corresponds to one of the applications used in an IPTV environment, and, more particularly, to a widget application for managing video functionality and video quality on a screen in the IPTV receiver.

Also, in the description of the present invention, a method for managing video functionality and video quality on the screen through a video management widget application in an IPTV environment will hereinafter be described in detail. Also, the description of the present invention provides a standardized framework enabling a widget application, such as the video management widget application of the present invention, to be executed in all IPTV receivers, i.e., in an IPTV terminal function (ITF). This is because, in an IPTV environment, the ITF has different hardware and operation system (OS) environment (or condition).

Accordingly, a user can solve a problem easily by optimizing the video output of an IPTV receiver or testing the video functionality of the IPTV receiver on his own. Also, the user can adjust video quality by receiving a video test stream (or an image) using (or through) a widget application in the present invention. When the user wants a video quality suitable for a broadcast program provided by a content provider or a service provider, he may download a video management widget application and adjust the video configuration (setting) of the IPTV receiver. Once the user installs the video management widget application in the IPTV receiver, he can simply test video functionality and video quality at an expert level without expensive video test equipment.

Therefore, according to the present invention, the user may download a proper video management widget application and execute the downloaded video management widget application at a browser, thereby being able to manage video functionality and video quality on the screen in the IPTV receiver. Also, for the convenience in searching and selecting the above-described video management filter, the present invention may provide a widget application. Also, in the present invention, a list of video management filters applicable to corresponding to the IPTV receiver or a receiver profile is managed. And, detailed information may be transmitted to the service provider or the contents provider, so as to be used in the searching of video management filters. Furthermore, according to the present invention, when an optimal user-designated video management filter is set-up, the widget application uses Broadband Content Guide (BCG) information or category information of a Content on Demand (CoD) Extensible Markup Language (XML) schema, so as to be automatically set-up. Thereafter, configuration information on the widget application for each user (i.e., user profile) is stored so as to be managed by the IPTV service provider, thereby enabling the user to use his (or her) own unique widget application at any location provided with IP connection.

FIG. 1 illustrates a general view describing an IPTV environment that ca provide a widget service according to the present invention.

Referring to FIG. 1, in an IPTV environment, a widget service is serviced from a server to a receiver through a network 120. The server may include a contents provider 130, a receiver manufacturer (or consumer manufacturer) server 135, and service providers, such as Widget service providers 140 and 145. Herein, the contents provider 130 manufactures contents included in an IPTV service. The receiver may include an IPTV receiver 100, a display device 105, and a delivery network gateway (DNG) 110. The display device 105 outputs the IPTV service received through the IPTV receiver 100. The delivery network gateway (DNG) 110 helps the IPTV receiver 100 to access the Internet. Herein, the network 120 may correspond to an open Internet or unmanaged network.

Referring to FIG. 1, as an example, the widget service is described to be provided to widget service providers 140 and 145, which correspond to a type of service provider. Therefore, the widget service may also be provided through a content provider 130 or a receiver manufacturer (or consumer manufacturer) server 135. Hereinafter, according to the present invention, a video management widget application will be given as an example of the widget service. However, this is merely exemplary, and, therefore, a widget application performing other functions may also be included herein.

Figure 2:
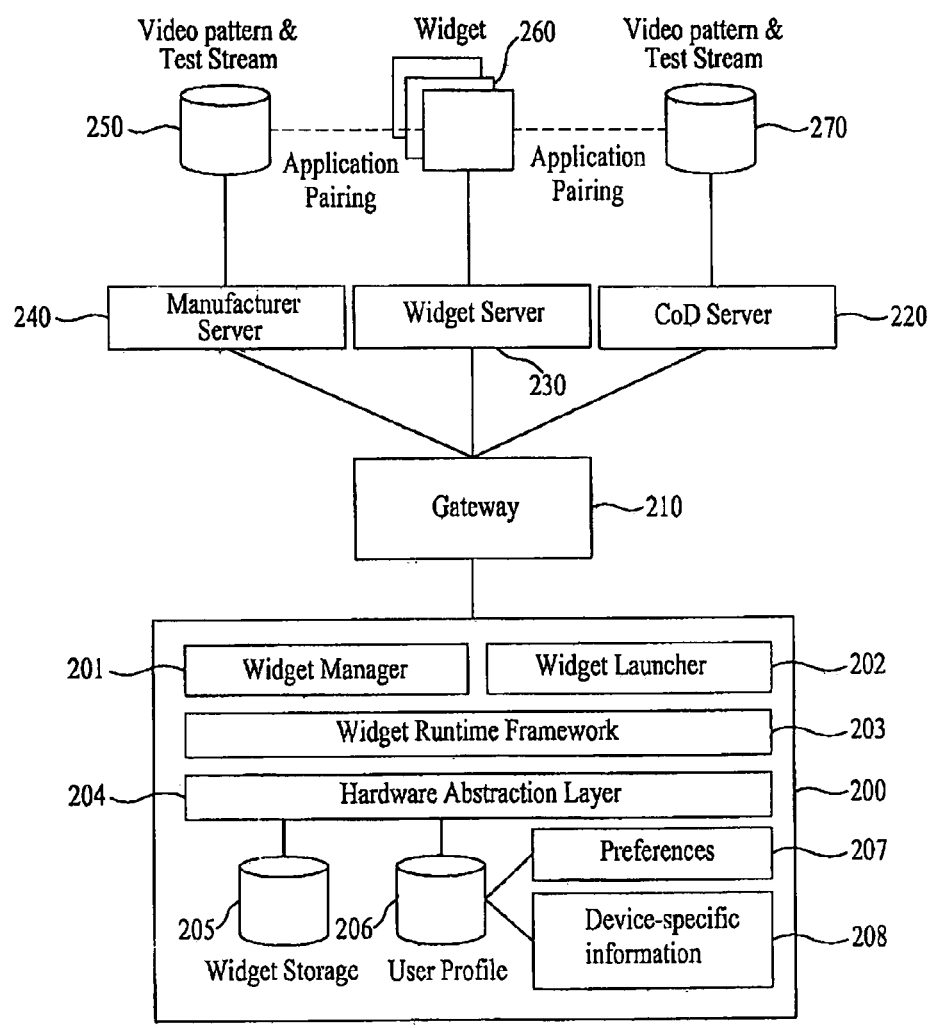
FIG. 2 illustrates an exemplary diagram for specifying a deployment process of a widget application in an IPTV environment according to the present invention.

FIG. 2 illustrates an exemplary diagram for specifying a deployment process of a Widget application in IPTV environment according to the present invention.

Referring to FIG. 2, the widget service is transmitted from a server to an accessible ITF 200 through a gateway 210. The server may include a CoD server 220, a widget server 230, and a manufacturer server 240. The CoD server 220 corresponds to a server that provides CoD services. Herein, the CoD server 220 includes a database having video pattern and test stream (or test images) stored therein. The manufacturer server 240 corresponds, for example, to a server for manufacturers manufacturing the ITF, and the manufacturer server 240 includes a database having video pattern and test stream adequate for the ITF manufactured by the manufacturers. The widget server 230 corresponds to a service provider providing a video management widget application. Herein, the widget server 230 may directly manufacture and provide a video management widget application or may receive a manufactured video management widget application, thereby servicing the corresponding video management widget application. Furthermore, the widget server 230 may share information with databases 250 and 270 in other servers via application pairing, so as to manufacture and service a widget application.

The ITF 200 may include one or more modules for executing the widget application, a widget storage unit 205 for storing the widget application, and a user profile storage unit 206. In FIG. 2, as the modules for executing the widget application, the ITF 200 may include a widget manager 201, a widget launcher 202, and a widget runtime framework 203. The ITF 200 also includes a widget storage unit 205 for storing the widget application and a user profile storage unit 206, both being subordinate to the hardware abstraction layer 204. However, the structure of the ITF shown in FIG. 2 is merely an example showing a minimum structure associated with the widget application operation. Therefore, the present invention will not be limited only to the example shown in FIG. 2.

The widget manager 201 may install and manage a widget application received via the gateway 210. The widget launcher 202 may launch the installed widget application in accordance with the User profile 206.

In the above description, the manufacturer server 240 may create device-specific information, such as a widget application or a video parameter, which can control detailed operations of the hardware respective to the ITF, and may distribute the created device-specific information so as to be linked with a $3^{rd}$-party widget application.

The widget application may be easily downloaded from the ITF 200 and installed. Also, the widget application may use a hardware profile of the IPTV, i.e., a receiver profile and a user profile, so as to identify the widget application that can be installed in accordance with each ITF.

Figure 3:
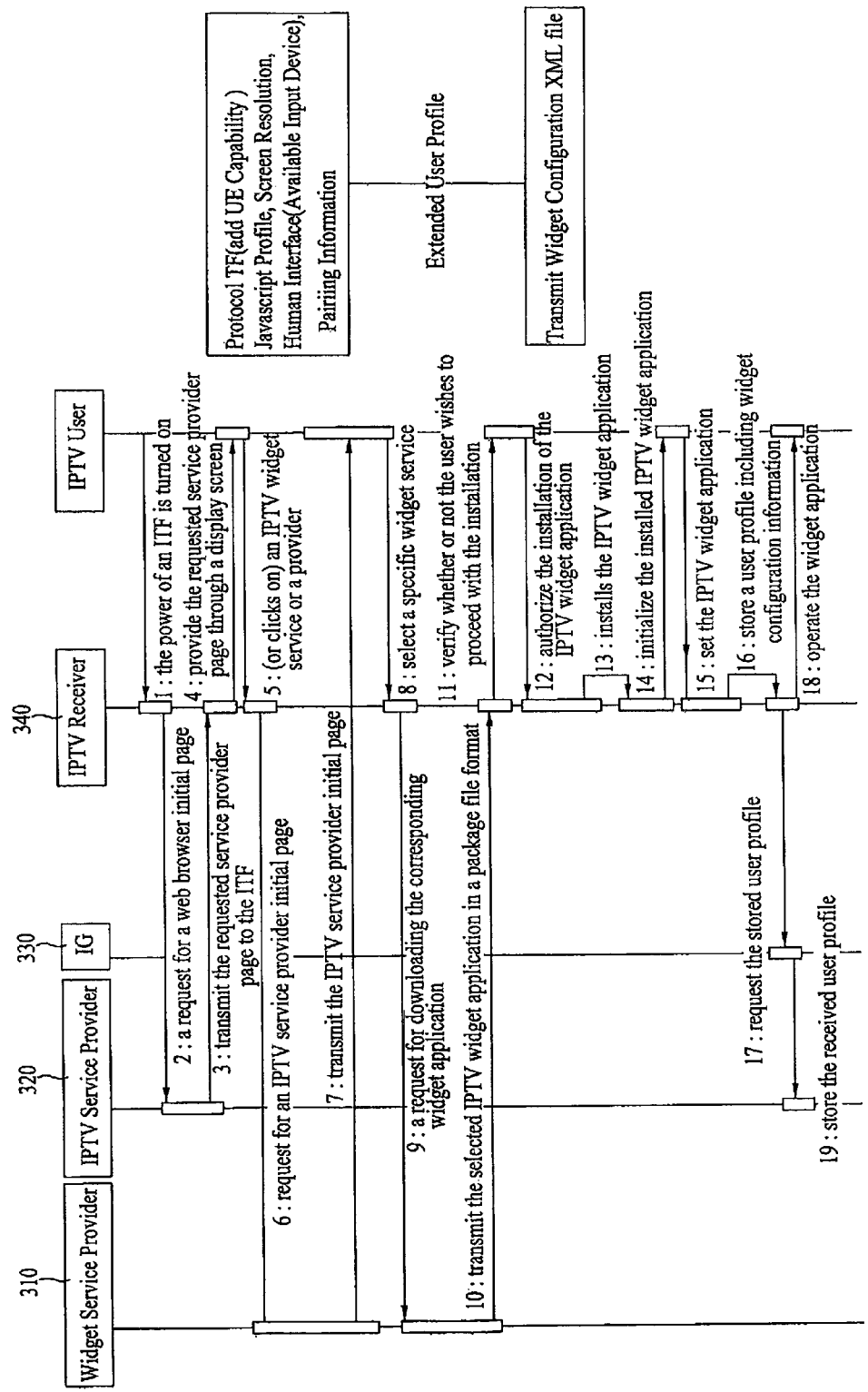
FIG. 3 illustrates an exemplary diagram for specifying a process of providing a widget service in an IPTV service provider according to the present invention.

FIG. 3 illustrates an exemplary diagram for specifying a process of providing a Widget service in an IPTV service provider according to the present invention.

Herein, in an IPTV environment, a widget service provider 310, an IPTV service provider 320, a gateway 330, and an ITF 340 may be involved in the widget servicing process (or the process of providing the widget service). However, the present invention will not be limited only to the example shown in FIG. 3. Therefore, a separate structure associated with the provision of a widget service may be further included in the IPTV environment, or, conversely, part of the structure may be omitted or a specific structure may be replaced with a different structure. For example, in FIG. 3, the widget service provider 310 and the IPTV service provider 320 may correspond to the same entity.

If the power of an ITF 340 is turned on by the user (STEP 1), the ITF 340 sends a request for a web browser initial page to the IPTV service provider 320 (STEP 2). Thereafter, the ITF 340 receives the requested service provider page from the IPTV service provider 320 (STEP 3).

The ITF 340 provides the requested service provider page received from the IPTV service provider 320 to the user through a display screen (STEP 4). Also, the IPTV service provider 320 may correspond to the same entity as an IPTV service profile Functional Entity (FE). Moreover, the IPTV service provider 320 may correspond to the IPTV service provider determined by default setting by the ITF 340.

When the user selects (or clicks on) an IPTV widget service or a provider from the initial page provided through the display screen (STEP 5), the ITF 340 accesses the widget service provider 310 and requests for an IPTV service provider initial page (STEP 6). According to the request, the widget service provider 310 transmits the IPTV service provider initial page to the ITF 340, and the ITF 340 provides the received IPTV service provider initial page to the user through the display screen (STEP 7). Herein, the widget service provider 310 may correspond to the same entity as an IPTV application FE. Also, as described above, when the user selects (or clicks on) an IPTV widget service or a provider, and when the corresponding initial page is requested, the ITF 340 may transmit the profile of the ITF 340 (i.e., receiver profile) to the widget service provider 310 in accordance with the related protocol along with the request.

When the user selects a specific widget service (STEP 8), the ITF 340 sends a request for downloading the corresponding widget application to the widget service provider 310, which provides the selected widget service (STEP 9). Based upon the download request received from the ITF 340, the widget service provider 310 transmits the selected IPTV widget application in a package file format (STEP 10). During this process, the user may search a widget application fro the IPTV widget service page displayed on the display screen of the ITF 340. More specifically, the user may search for a widget application suitable for a user equipment class (UE) capacity.

In relation to the IPTV widget application within the package received from the widget service provider 310, the TIF 340 may verify whether or not the user wishes to proceed with the installation through an on-screen display (OSD) (STEP 11). Based upon the verified result, if the user wishes to install the application, the ITF 340 authorizes the installation of the IPTV widget application within the received package (STEP 12).

If the authorization is transmitted by the user, the ITF 340 installs the IPTV widget application included in the received package (STEP 13). Subsequently, the ITF 340 initializes the installed IPTV widget application (STEP 14) and provides the installed and initialized IPTV widget application to the user. Thereafter, the ITF 340 receives the IPTV widget application settings from the user (STEP 15).

The ITF 340 stores a user profile including widget configuration information set-up by the user in relation with the installed IPTV widget application (STEP 16). Then, the ITF 340 requests the stored user profile to pass through the gateway 330 and stored in the IPTV service provider 320 (STEP 17). Accordingly, the IPTV service provider 320 stores the received user profile (STEP 19). During this process, the ITF 340 may operate the widget application in which the user settings have been applied (STEP 18). In the example given in FIG. 3, the user profile is stored in the IPTV service provider 320. However, this is merely exemplary. Accordingly, in another example, the user profile may be alternatively stored in the widget service provider 310. The user profile may be differentiated according to each user by the server 310 and/or 320, thereby being stored in the respective database. Therefore, the user may access the server at any time and any place and call his (or her) own user profile information, thereby being able to use his (or her) own unique widget application from an ITF different from his (or her) own ITF.

Hereinafter, the receiver profile and the user profile of FIG. 3 will be described in more detail with reference to FIG. 4, FIG. 5, and FIG. 6.

Figure 4:
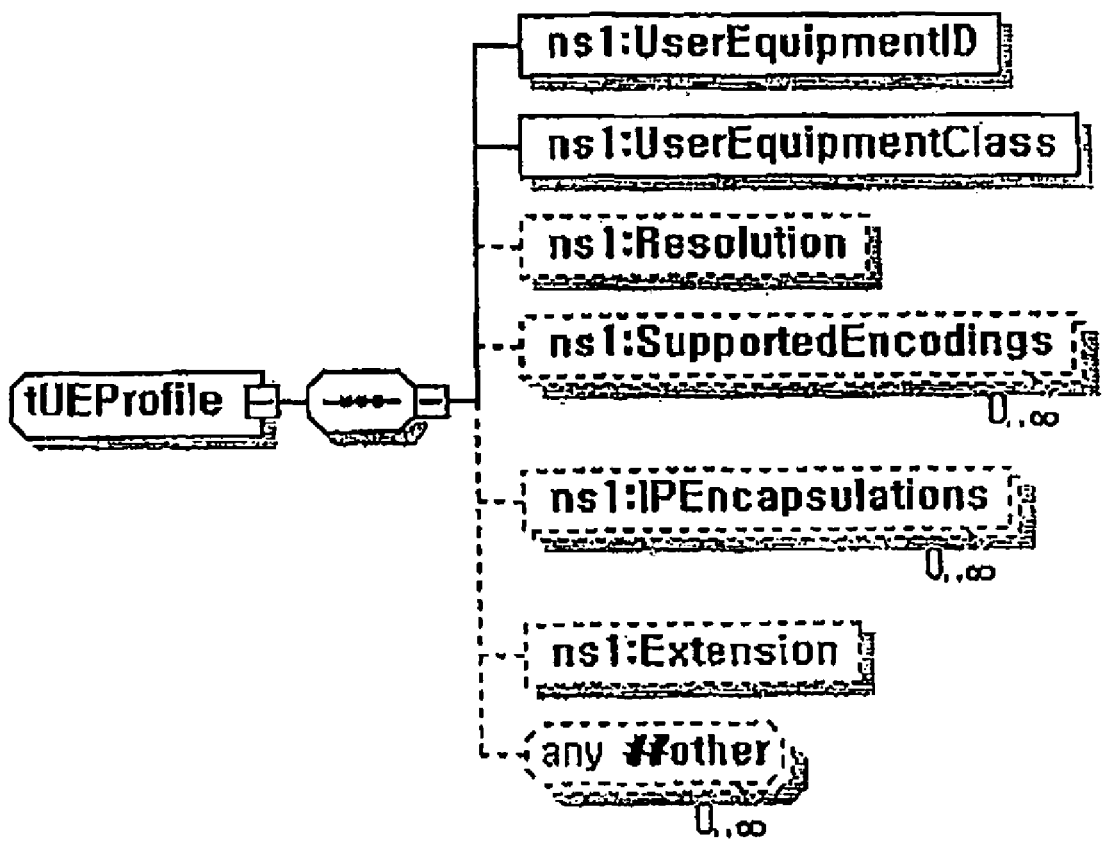
FIG. 4 illustrates a schematic diagram of a receiver profile configured according to a first embodiment of the present invention.

FIG. 4 illustrates a schematic diagram of a receiver profile configured according to a first embodiment of the present invention. FIG. 5 illustrates a schematic diagram of a receiver profile configured according to a second embodiment of the present invention. And, FIG. 6 illustrates a diagram showing an XML schema of FIG. 5.

By searching/browsing a widget application and by transmitting information associated to execution conditions (or environment) of the widget application, such as ITF functions, available resource amount (or size), and so on, to the server in order to download the searched widget application, the ITF may be capable of optionally downloading the adequate widget application.

Hereinafter, the above-described receiver profile transmitted from the ITF will be specified as follows.

Referring to FIG. 4, the user profile includes a UserEquipmentID element, a UserEquipmentClass element, a Resolution element, a SupportedEncodings element, an IPEncapsulations element, and an Extension element.

The UserEquipmentID element includes a model Unique Identifier (UID) of the corresponding ITF. The Resolution element includes video resolution information of the corresponding ITF. And, the SupportedEncodings element includes information on the video frequency of the corresponding ITF.

Figure 5:
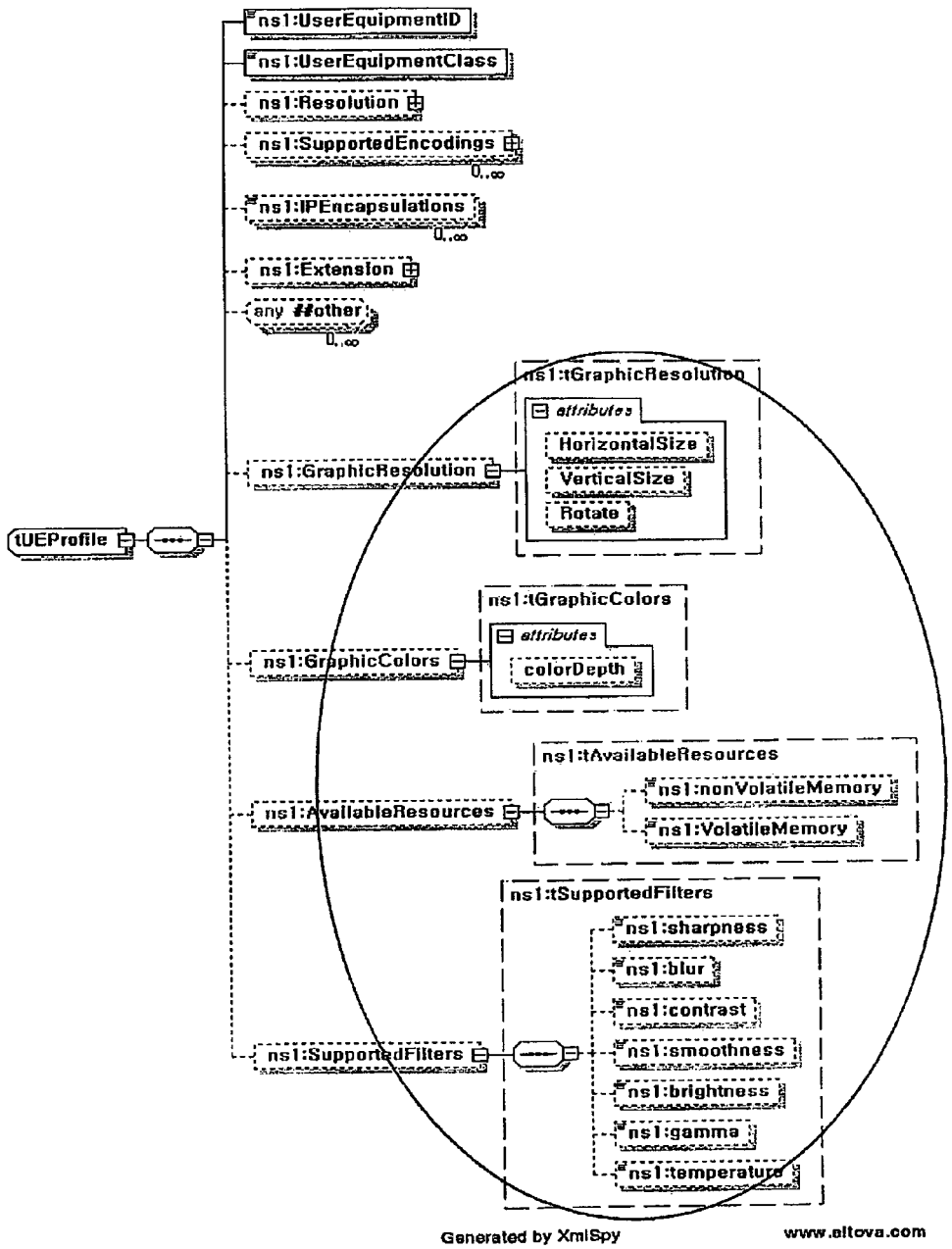
FIG. 5 illustrates a schematic diagram of a receiver profile configured according to a second embodiment of the present invention.

The receiver profile of FIG. 5 further includes a Graphic Resolution element, a Graphic colors element, an Available Resources element, and a Supported Filters element in addition to the receiver profile shown in FIG. 4.

Referring to FIG. 5 and FIG. 6, the Graphic colors element is defined as a tGraphicColor Type and includes information indicating the processing ability of the ITF on the graphic color. Herein, the graphic color refers to a bit-depth of each pixel, when graphic data are rendered to the OSD. The tGraphicColor Type can be defined based on a color depth attribute. Any one value of 32 bpp, 24 bpp, 16 bpp, and 8 bpp may be given as an enumeration value of the color depth attribute.

The Graphic Resolution element is defined as a tGraphicResolution Type and includes information indicating the processing ability of the ITF on the graphic resolution. Herein, the graphic resolution refers to a resolution of OSD graphic that can be used by the widget application. The tGraphicResolution Type can be defined based on a horizontal size attribute, a vertical size attribute, and a rotation attribute.

The Available Resources element is defined as a tAvailableResolution Type and includes information indicating the available resource amount for the widget application. Herein, the resource amount refers to a non-volatile memory and a volatile memory.

The Supported Filters element is defined as a tSupportedFilters Type and includes information indicating a function, among many video functions, that can be executed by the user equipment. Therefore, among the video functions described in the present invention, the user equipment may transmit executable video functions to the server, thereby being able to download and use only the video management widget application that can be used by the user equipment.

Figure 7:
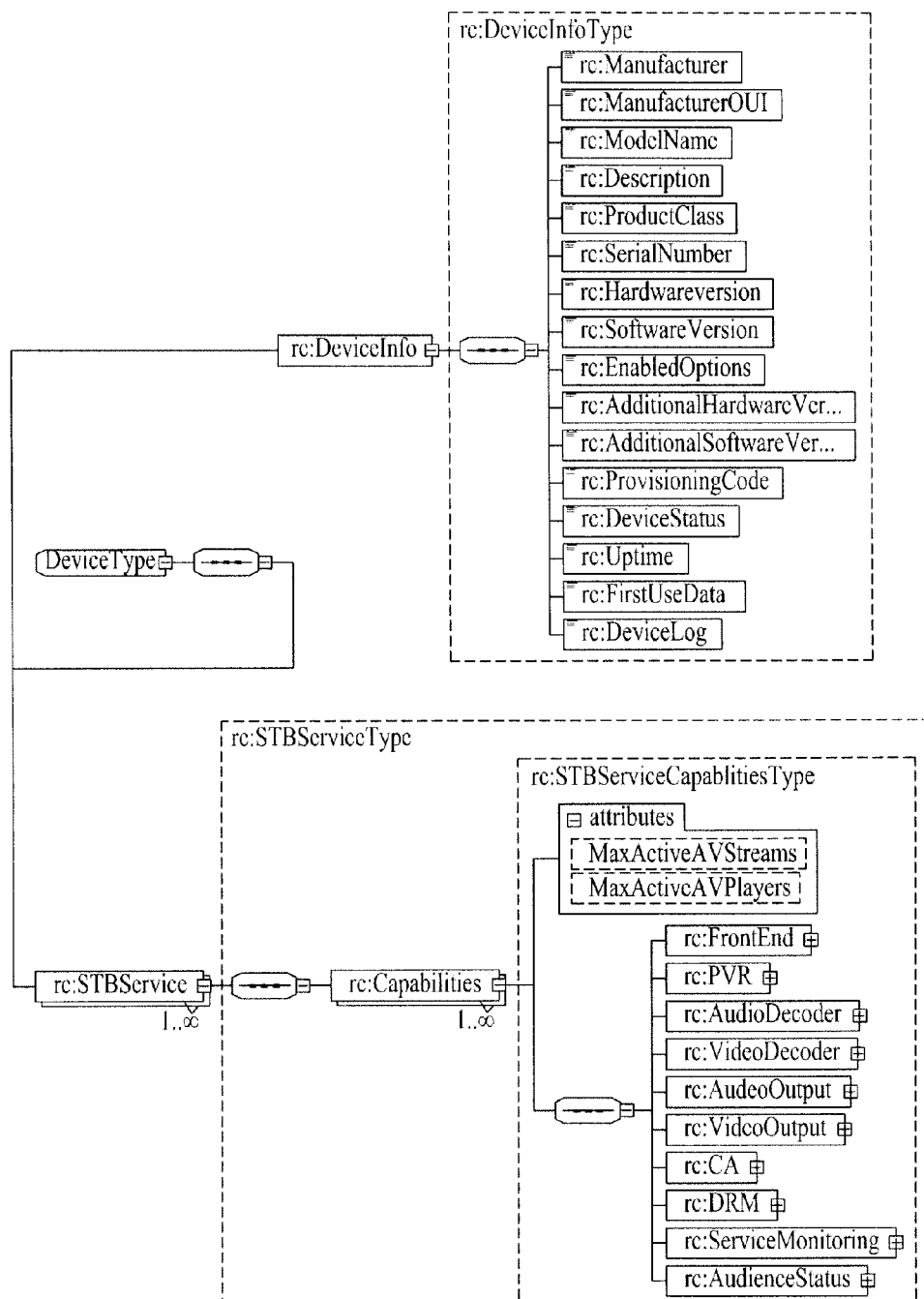
FIG. 7 illustrates a schematic diagram of a receiver profile configured according to a third embodiment of the present invention.

FIG. 7 illustrates a schematic diagram of a receiver profile configured according to a third embodiment of the present invention.

The receiver profile according to the third embodiment of the present invention includes information related to receiver capabilities. Such information related to receiver capabilities (or performance) is largely divided into a DeviceInfo element, which is defined as a DeviceInfo Type, and a STBService element, which is defined as an STBService Type.

The DeviceInfo element may include a Manufacturer element, a Manufacturer OUI element, a Model Name element, a description element, a productclass element, a serial number element, a hardware version element, a software version element, an enabled options element, an additional hardware version element, an additional software version element, a provisioning element, a device status element, an Uptime element, a first use data element, and a device log element.

The STBService element may include a FrontEnd element, a Personal Video Recorder (PVR) element, an AudioDecoder element, a VideoDecoder element, an AudioOutput element, a VideoOutput element, a Conditional Access (CA) element, a Digital Rights Management (DRM) element, a ServiceMonitoring element, and an AudienceStatus element. Also, attributes of the STBService element may be a MaxActiveAVStreams attribute and a MaxActiveAVPlayers attribute.

Figure 8:
FIG. 8 illustrates a schematic diagram of a receiver profile configured according to a fourth embodiment of the present invention.

FIG. 8 illustrates a schematic diagram of a receiver profile configured according to a fourth embodiment of the present invention. And, FIG. 9 and FIG. 10 illustrate a diagram showing an XML schema of FIG. 8.

In FIG. 8, the DeviceInfo element of FIG. 7 further includes an AvailableResources element on available resource information for executing the widget application. The AvailableResouces element may include a nonVolatileMemory element and a VolatileMemory element.

Referring to the FIG. 9 and FIG. 10, sub-elements of the DeviceInfo element is specified as follows.

The DeviceInfo element is defined as a type of an object, wherein the object contains general device information. The Manufacturer element is defined as a type of string (64) and descriptive of a manufacturer of the CPE (human readable string). The ManufacturerOUI element is defined as a type of string (6) and descriptive of structurally unique identifier of the device manufacturer. The Model Name element is defined as a type of string (64) and descriptive of a model name of the CPE (human readable string). The description element is defined as a type of string (256) and descriptive of a full description of the CPE device (human readable string). The productclass element is defined as a type of string (64) and descriptive of an identifier of the class of product to which the serial number applies. In other words, for a given manufacturer, this parameter is used to identify the product or class of for product for which the SerialNumber parameter is unique. The serial number element is defined as a type of string (64) and descriptive of a serial number of the CPE.

The hardware version element is defined as a type of string (64) and descriptive of a string identifying the particular CPE model and version. The software version element is defined as a type of string (64) and descriptive of a string identifying the software version currently installed in the CPE. The enabled options element is defined as a type of string (1024) and descriptive of a comma-separated list (maximum length 1024) of strings. The Comma-separated list corresponds to a list of the OptionName for each Option that is currently enabled in the CPE. The OptionName for each option is identical to the OptionName element of the OptionStruct. Only these options are listed, wherein the respective State indicates that the corresponding option is enabled. The additional hardware version element is defined as a type of string (64) and descriptive of a comma-separated list (maximum length 64) of strings. The comma-separated list of any additional version represents any additional hardware version information a vendor may wish to supply. The additional software version element is defined as a type of string (64) and descriptive of a comma-separated list (maximum length 64) of strings. The comma-separated list of any additional version represents any additional software version information the vendor may wish to supply.

The provisioning element is defined as a type of string (64) and descriptive of an identifier of the primary service provider and other provisioning information, so as to determine service provider-specific customization and provisioning parameters. The device status element is defined as a type of string (64) and descriptive of a current operational status of the device. The current operational status corresponds to any one of 'up', 'initializing', 'error', and 'disabled'. The Uptime element is defined as a type of unsignedInt and descriptive of the time in seconds since the CPE was last restarted. The first use data element is defined as a type of dateTime and descriptive of a date and time in Universal Time Coordinated (UTC) that the CPE first successfully established an IP-layer network connection and acquired an absolute time reference using NTP or equivalent over the network connection. The CPE may reset this date after a factory reset. If NTP or equivalent is not available, this parameter, if present, should be set to an Unknown Time value. The device log element is defined as a type of string (32768) and descriptive of a vendor-specific log(s).

The nonVolatileMemory element is defined as a type of unsignedInt and descriptive of the amount (or size) of an available non-volatile memory. The VolatileMemory element is defined as a type of unsignedInt and descriptive of the amount (or size) of an available volatile memory.

Figure 11:
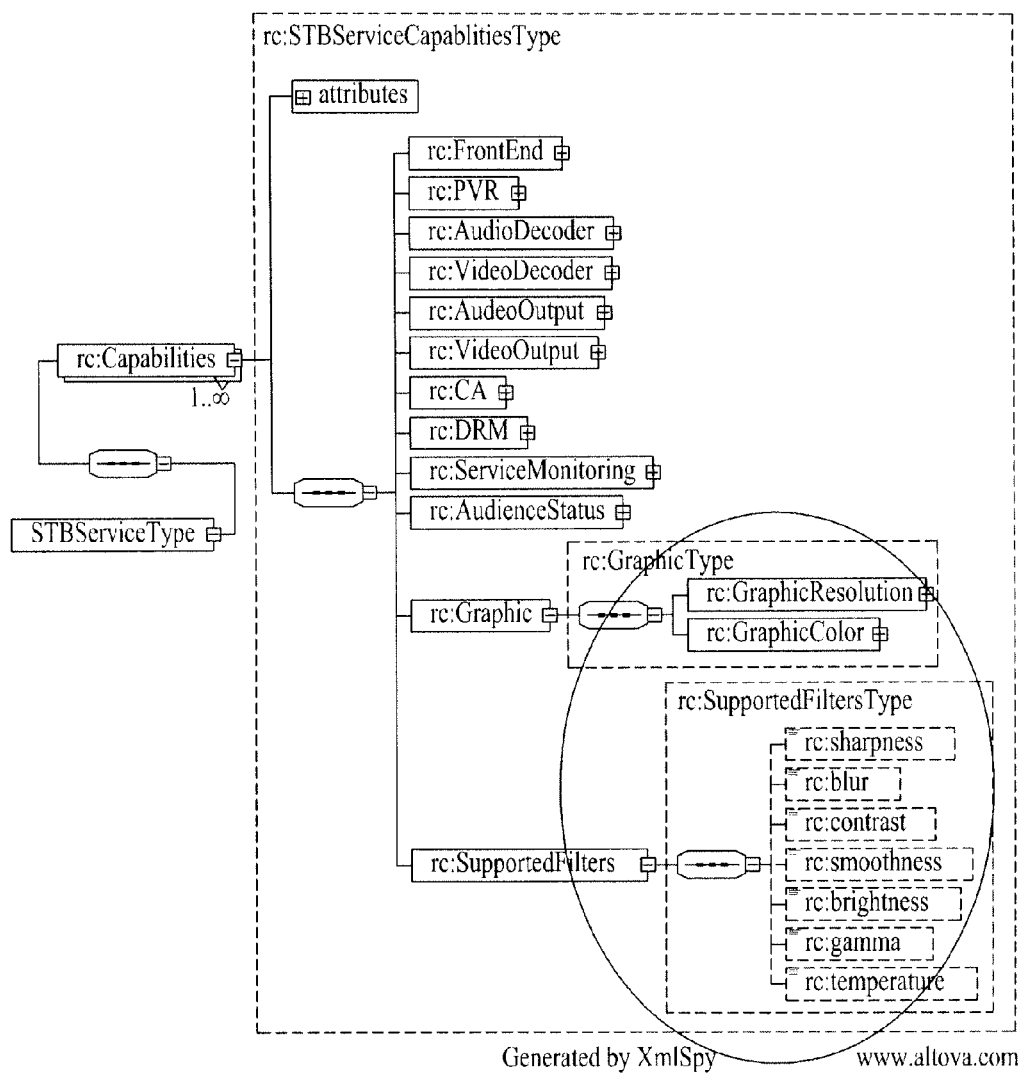
FIG. 11 illustrates a schematic diagram of a receiver profile configured according to a fifth embodiment of the present invention.

FIG. 11 illustrates a schematic diagram of a receiver profile configured according to a fifth embodiment of the present invention. And, FIG. 12 illustrates a diagram showing an XML schema of FIG. 11.

In FIG. 11, the STBService element of FIG. 7 further includes a Graphic element for describing (or specifying) OSD graphic functions of a set-top, and a SupportedFilters element for specifying a supportable video filter function. The Graphic element may include a GraphiResolution element and a GraphicColor element.

Referring to the FIG. 12, sub-elements of the STBService element are specified as follows.

The FrontEnd element is descriptive of a function of the front end, which acts as an interface between the network and the inner functional blocks of the STB. The PVR element is descriptive of a function of the PVR, which stores programs coming (or delivered) from any Front End and sends stored programs to audio and/or video decoders or to the (output) IP front end. The AudioDecoder element is descriptive of a function of the audio decoder, which receives an elementary audio stream, decodes the audio, and outputs an uncompressed native audio stream to an audio output object. The VideoDecoder element is descriptive of a function of the video decoder, which receives an elementary video stream, decodes the video, and outputs an uncompressed native video stream to a video output object. The AudioOutput element is descriptive of a function of the audio output, which receives uncompressed audio streams from one or more audio decoders and performs format adaptations. The VideoOutput element is descriptive of a function of the video output, which receives uncompressed video streams from one or more video decoders, and performs format adaptations. The CA element is descriptive of a function of the CA component, which contains details of one of the CA mechanisms that may be supported by the STB. The DRM element is descriptive of a function of the DRM component, which contains details of one of the DRM mechanisms that may be supported by the STB. The ServiceMonitoring element is descriptive of a service monitoring statistics, which are collected based upon service types. The main reason for defining service types is that the service types correspond to different protocol stacks and configurations, and statistics collected across multiple service types would be meaningless. Finally, the AudienceStatus element is descriptive of a statistics, which contains audience viewing statistics, organized by channels.

Furthermore, since the Graphic element and the Supported Filters element further included in FIG. 11 and FIG. 12 are identical to those shown in FIG. 5, detailed description of the same will be omitted for simplicity.

The above-description consists of details on the receiver profile of the ITF. Hereinafter, the user profile will now be described in detail. In the following description, when the user uses a video management widget application according to the present invention for managing video functionality and video quality on a screen in the IPTV receiver, the user profile may include all content modified according to the user settings made during this process (e.g., settings that change values of particular functions).

Figure 13:
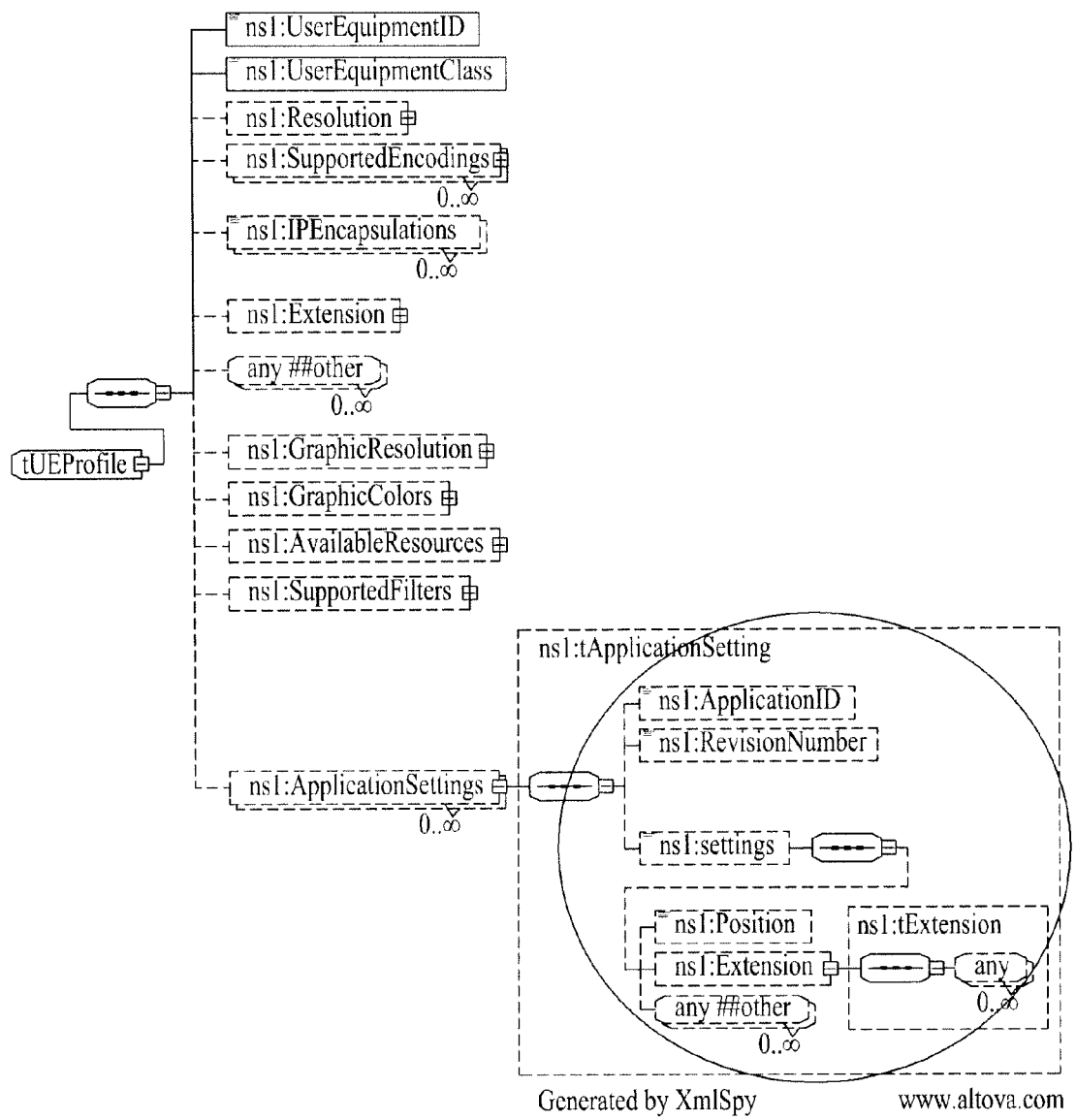
FIG. 13 illustrates a schematic diagram of a user profile configured according to an embodiment of the present invention.

FIG. 13 illustrates a schematic diagram of a user profile configured according to an embodiment of the present invention. And, FIG. 14 illustrates a diagram showing an XML schema of FIG. 13.

FIG. 13 and FIG. 14 illustrate a UE profile. The UE profile manages information on widget applications that have been installed for each ITF and the respective environment settings as the user's profile. Accordingly, the UE profile enable the user to use his (or her) own settings without any modification even when the user accesses a related service through any terminal (or user equipment) other than his (or her) own user equipment.

Hereinafter, among the elements included in the user profile, detailed description of the elements that are identical to those included in the receiver profile will be omitted for simplicity. Accordingly, only the elements that are newly introduced will be described in detail. Referring to FIG. 13 and FIG. 14, unlike the receiver profile, the user profile includes an ApplicationSettings element. The ApplicationSettings element may include an ApplicationID element, a RevisionNumber element, and a Settings element. The ApplicationID element corresponds to an element respective to an identifier that can uniquely identify each widget application. The RevisionNumber element corresponds to an element that indicates the version of each widget application. Therefore, the ApplicationID and version information for each widget application are stored in the user profile, thereby being able to call upon a specific widget application. Furthermore, the Settings element corresponds to an element that stores user-specific set-up information for each widget application. Herein, the Settings element includes a Position element, an Extension element, and other elements. More specifically, the Position element indicates position information of each widget application within the overall list of widget applications. And, the Extension element and other elements indicate information on environment settings for each widget application. Accordingly, by storing the widget application installed in each ITF and the information on the environment settings for each widget application in the server through the user profile information, the user may be able to easily use the same environment even when using a related service through any random ITF.

Hereinafter, the processes of downloading and installing, upgrading, and deleting video management widget applications in an ITF will be described in detail with reference to FIG. 3 to FIG. 14.

Now a description will be made of methods for enabling a user to test video streams available to an IPTV receiver with regard to compatibility, to change configurations such as a video configuration per resolution (e.g., overscan, and the like) available to the IPTV receiver and a configuration of a Coder-Decoder (Codec) for reproducing Moving Picture Experts Group-2 (MPEG-2) and MPEG-4 Transport Streams (TSs), or to optimize the configurations.

To this end, a method for installing and upgrading a video management widget application in an IPTV receiver, the types of video tests that may be performed by the video management widget application, a method for performing a test by the video management widget application, the types of functions for changing a video decoder configuration, provided by the video management widget application, and method for setting the functions by the video management widget application will be described herein, for the convenience' sake of description. The following description will be made with the appreciation that the description of FIGS. 2 to 14 are referred to for a configuration or an operation whose description is regarded as redundant or whose description is not provided herein.

A user may want a quick and simple video test before viewing a high-quality content, or he may want a video quality adjustment by a video test if the video quality is not satisfactory during viewing a content. The high-quality may be defined any one of a high-definition (HD) and a standard-definition (SD).

A description will first be made of a method for installing a video management widget application in an IPTV receiver.

Figure 15:
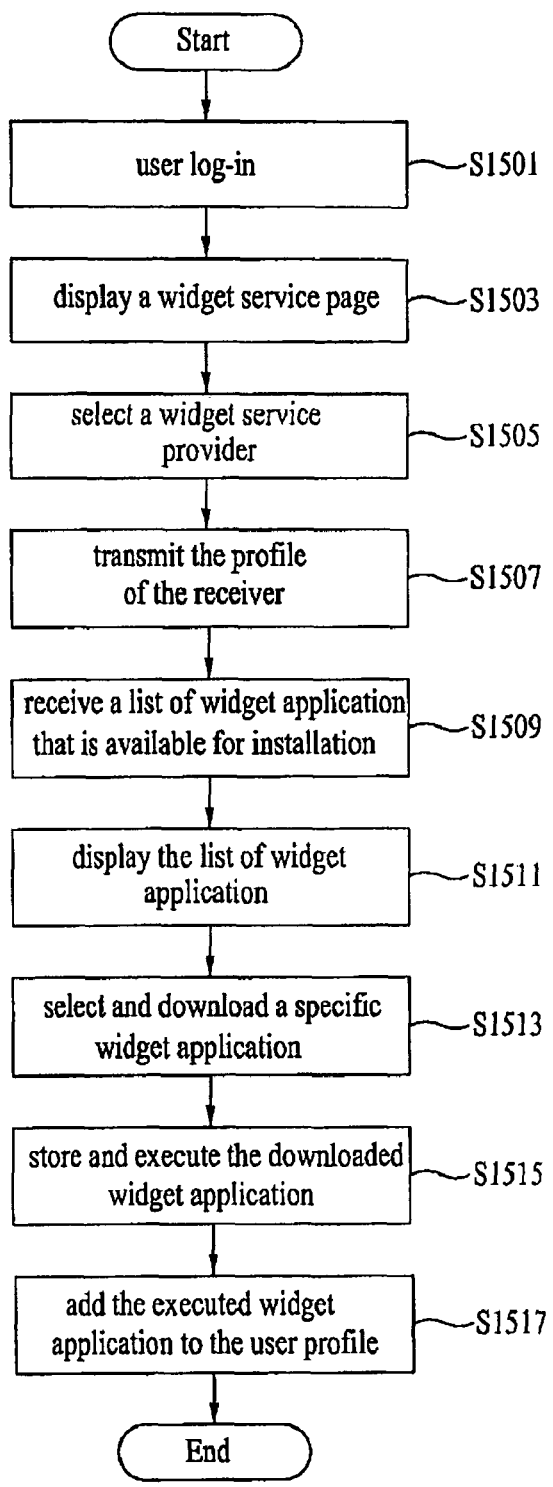
FIG. 15 is a flowchart illustrating a method for installing a video management widget application by a user according to an exemplary embodiment of the present invention.

FIG. 15 is a flowchart illustrating a method for installing a video management widget application by a user according to an exemplary embodiment of the present invention.

Referring to FIG. 15, the user turns on the ITF and logs in to the ITF in step S1501.

The ITF displays a widget service page received from an IPTV service provider on a screen in step S1503.

The user selects a widget service provider from the widget service page displayed on the screen in step S1505.

The ITF transmits a receiver profile to the selected widget service provider in step S1507.

The ITF receives a list of installable or compatible video management widget applications that the widget service provides has transmitted according to the receiver profile in step S1509.

The ITF displays a list of the received video management widget applications on the screen in step S1511.

Upon user selection of a video management widget application from the list, the ITF downloads the selected video management widget application in step S1513.

The ITF stores the downloaded video management widget application and launches the video management widget application in step S1515. For instance, the video management widget application may be launched through a browser.

The ITF adds information about the video management widget application (e.g., configuration) to a user profile in step S1517.

In this manner, for example, a video management widget application is installed according to the present invention.

Figure 16:
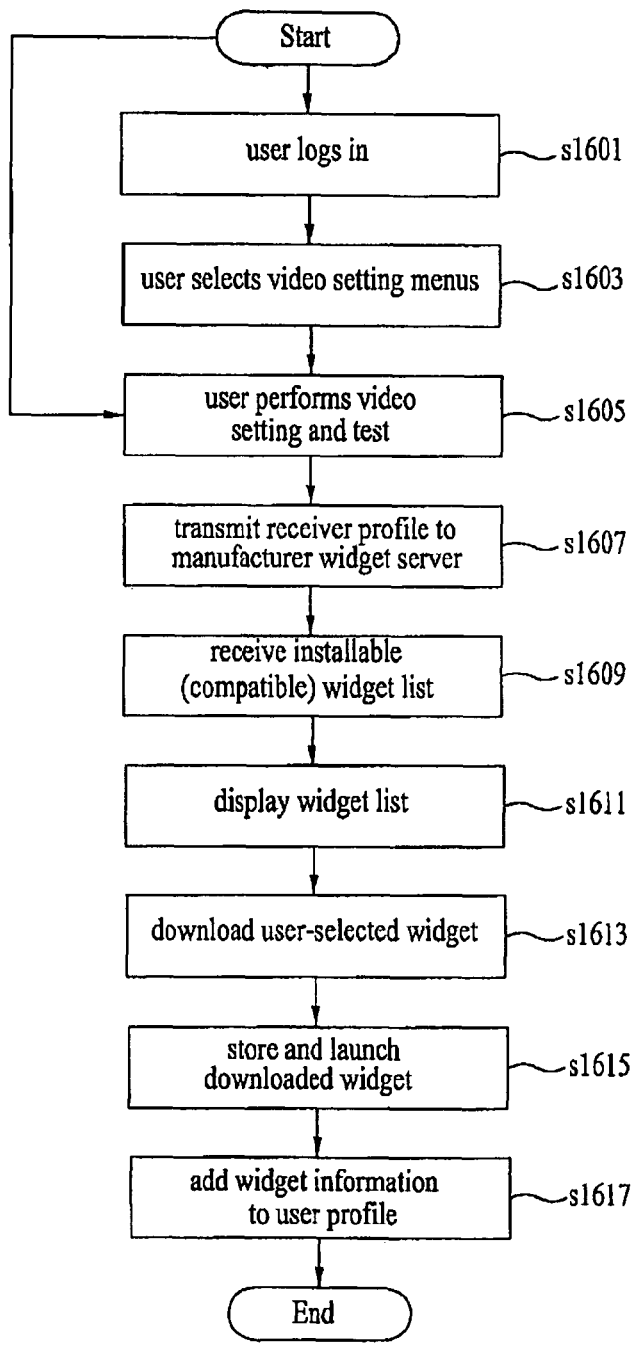
FIG. 16 is a flowchart illustrating a method for installing the video management widget application with the support of a manufacturer according to an exemplary embodiment of the present invention.

FIG. 16 is a flowchart illustrating a method for installing the video management widget application with the support of a manufacturer according to an exemplary embodiment of the present invention.

Referring to FIG. 16, the user turns on the ITF and logs into the ITF in step S1601.

The user selects a video setting menu for video management in step S1603.

The user performs a video setting and a video test in step S1605. Under the circumstances, this step may be directly performed by inputting a video control key by the user.

The ITF transmits a receiver profile to a manufacturer widget server in step S1607.

The ITF receives an installable widget list that the manufacturer widget server has transmitted based on the receiver profile in step S1609.

The ITF displays the received widget list on the screen for the user in step S1611.

When the user selects a specific widget application from the displayed widget list, the ITF downloads the selected widget application in step S1613.

The ITF stores and launches the downloaded widget application in step S1615.

The ITF adds information about the widget application (e.g., specific settings) to a user profile in step S1617.

The video management widget application is installed in the ITF by the procedures illustrated in FIGS. 15 and 16.

Now a description will be made of a method for performing a video test and adjusting a video quality on a screen using (or through) the installed video management widget application.

Figure 17:
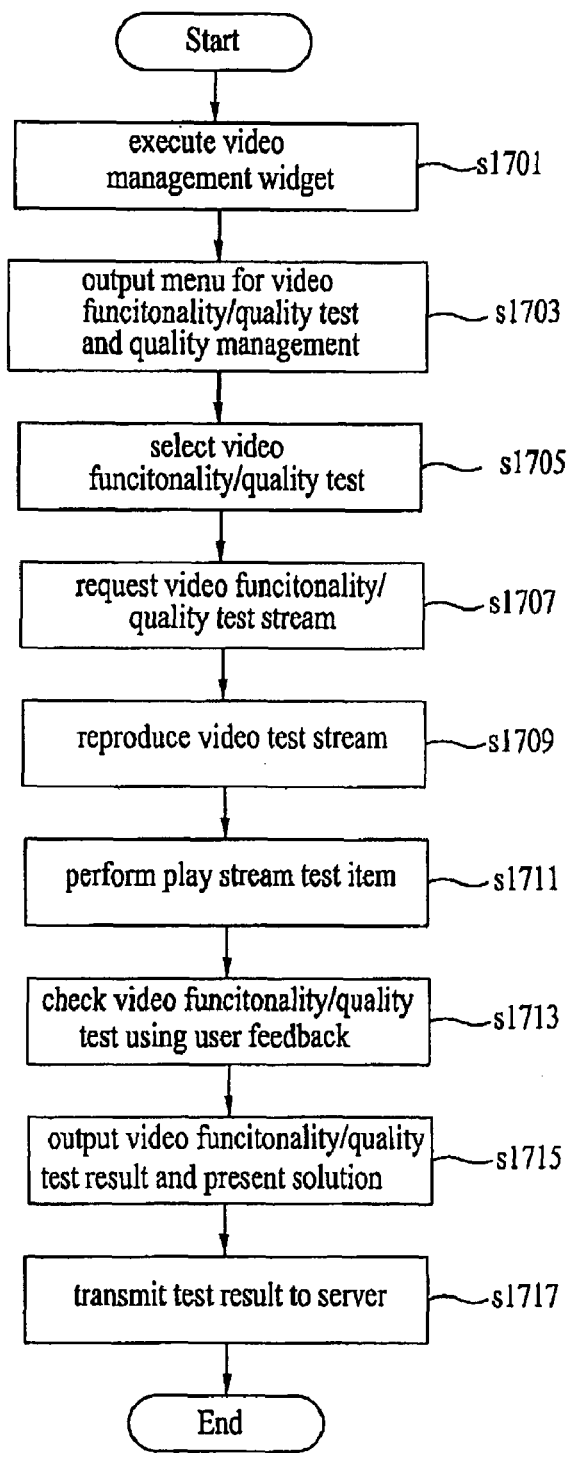
FIG. 17 is a flowchart illustrating a method for executing the video management widget application according to an exemplary embodiment of the present invention.

FIG. 17 is a flowchart illustrating a method for executing the video management widget application according to an exemplary embodiment of the present invention.

Referring to FIG. 17, the ITF executes the already installed video management widget application, upon user request in step S1701. In the presence of a plurality of video management widget applications, the ITF may provide a User Interface (UI) that allows the user to select one of the video management widget applications.

When the video management widget application is executed, the ITF outputs a menu for video functionality/quality test and video quality management on the screen in step S1703.

The ITF receives a user input indicating a user selection of a video functionality/quality test from the user in step S1705.

The ITF requests a video functionality/quality test stream (s) (or images) required for the selected video functionality/quality test to a server in step S1707.

The ITF reproduces the video functionality/quality test stream(s) received from the server in step S1709. Herein, the video functionality/quality test stream can be stored at a storage unit in the ITF.

Upon user selection of a play stream test item for the reproduced video functionality/quality test stream, the ITF performs an operation (or a test) corresponding to the selected test item in step S1711.

The ITF receives a feedback concerning the test item execution from the user and checks the video functionality/quality test according to the feedback in step S1713.

The ITF outputs the result of the video functionality/quality test on the screen in step S1715. Herein, the ITF may give a solution to a possibly generated problem on the screen.

The ITF transmits the video functionality/quality test result to the server in step S1717. The server may build a database with the video functionality/quality test result of each ITF.

Figure 18:
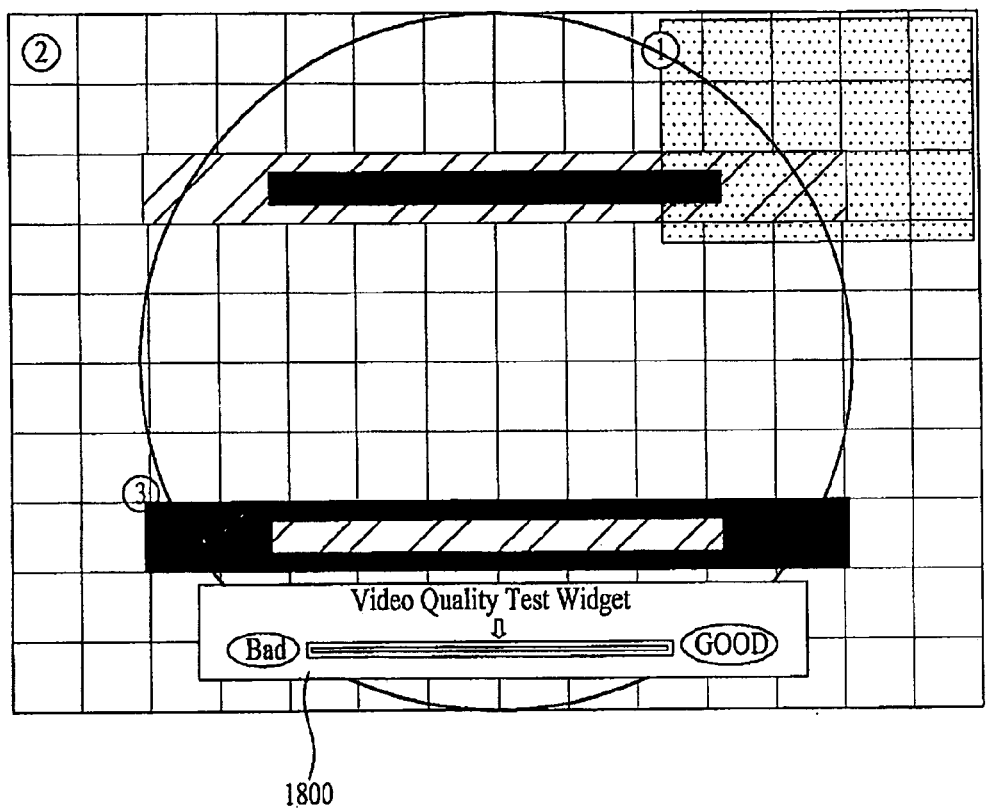
FIG. 18 is a diagram illustrating a video pattern test using the video management widget program according to an exemplary embodiment of the present invention.

FIG. 18 is a diagram illustrating a video pattern test using the video management widget program according to an exemplary embodiment of the present invention.

FIG. 18 illustrates a diagram reproduced using a video test stream received in real time or downloaded from the Internet Protocol (IP) according to a program of the installed video management widget application by the user.

During reproducing the video test stream, the user may enter a video quality satisfaction degree regarding the current video test stream. To receive the user's satisfaction degree by the video management widget application, the ITF may display various quality criteria. Or a repair and maintenance personnel in charge of IPTV service or interactive service-enabled TV receivers on the manufacturer's side may receive a user input and change settings remotely based on the user input.

The manufacturer may change the current video settings based on the user satisfaction degree, provide the changed video screen to the user, and receive a user satisfaction degree about the video quality of the video screen again.

The manufacturer collects various video test patterns or video quality information remotely in the above manner, and optimizes IPTV receivers according to users.

In FIG. 18, reference numeral (1) denotes a user-selected area having a low sharpness. Thus the video management widget application guides the user to perform additional settings or displays adjustable menus on the screen so that the user can change settings on his own.

Reference numeral (2) denotes an exemplary video test stream received from the manufacturer or the content provider in order to perform a video test in the video management widget application. The video test stream may be reproduced, for example, in two methods. One of the methods is to reproduce the video test stream like a live stream using a Real-time Transport Protocol (RTP) packet such as a Content on Demand (CoD) packet and the other is to reproduce the video test stream after it is downloaded.

Reference numeral (3) denotes the video management widget application downloaded by the user. By the video management widget application, the user may perform a video test and adjust video quality in an order set by a test procedure. The video management widget application may request a necessary video test stream(s) or image(s) to the server during the test in progress and may store and reproduce the video test stream(s) by interfacing with a native TV application manager. Referring to FIG. 2, this is possible by a widget runtime framework module 203 and a widget manager module 201.

With reference to Table 1, the types of video quality tests that can be performed by the video management widget application will be described below. That is, Table 1 presents an exemplary video play test by the video management widget application.

TABLE 1

| Video Test Function | Description | Example |
| --- | --- | --- |
| MPEG-2 TS Test Pattern | HD DVD compatible video MPEG-2 stream | |
| Free Run Video Test | MPEG-2 or MPEG-4 Video stream it can come from internet or managed network | Elephant Dream(Open Source Movie, Free MPEG-2, MPEG-4 video stream) |

As illustrated in Table 1, the ITF may perform an MPEG-2 TS play test to check the functionality of the IPTV receiver. The ITF may perform a test for video adjustment as well as the MPEG-2 TS play test by downloading information from the manufacturer server or the widget application server. During playing a content, errors generated in a video decoder or a video display processor may be stored in the memory, thus affecting a test result.

A video quality test as well as the play functionality test is also possible with the video management widget application. Video management widget applications such as a vertical resolution pattern, a vertical resolution pattern with motion, a vertical resolution with motion and 3:2 pulldown pattern, a color bar pattern, and an overscan and pixel crop pattern, and the like can control the video quality of the IPTV receiver to adjust in various manners including video quality adjustment and tests illustrated in the above table.

Figure 19:
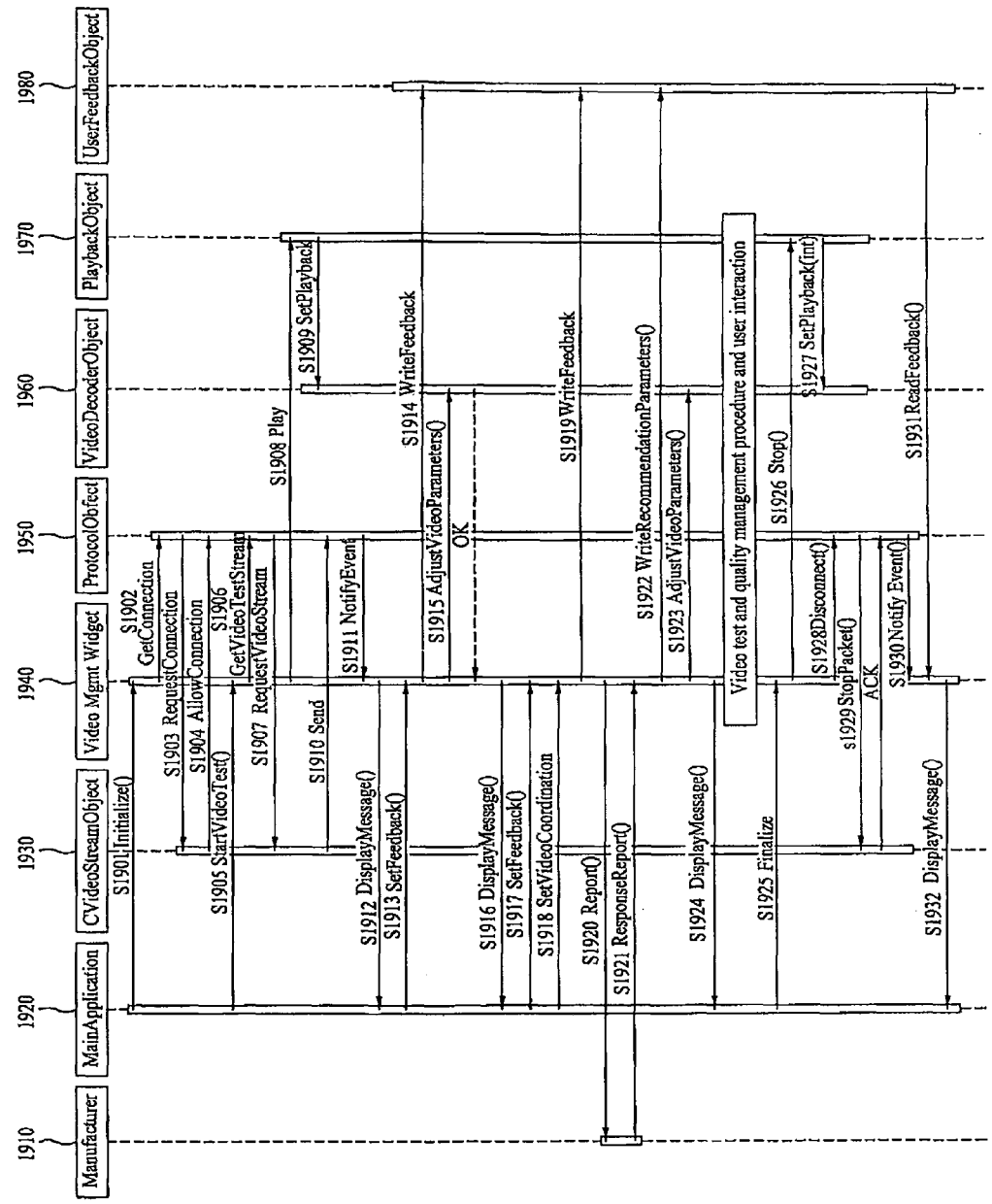
FIG. 19 is a high-level sequence diagram of the video management widget application according to an exemplary embodiment of the present invention.

FIG. 19 is a high-level sequence diagram of the video management widget application according to an exemplary embodiment of the present invention.

Although APIs called by the video management widget application are not illustrated in a table or a drawing herein, the names of exemplary APIs and an exemplary operation order are shown in FIG. 19.

Referring to FIG. 19, a high-layer operation of the video management widget application is described as functions.

The video management widget application may visually notify the user of a current test in progress and what is a normal video screen.

The user may change a video quality according to a video quality improvement algorithm in the video management widget application by notifying the position of an abnormal video part on a displayed screen according to an indication of the video management widget application. The video management widget application may provide menus that enable the user to adjust video quality directly. The video management widget application may perform a video functionality test and a video quality test upon user request, collect user feedbacks, and store them during the tests. When the tests are finished, the video management widget application may output test results on the screen.

Referring to FIG. 19, a manufacturer, a main application, a video management widget application, and many other objects are involved in the high-level sequence of the video management widget application. The objects may include CVideoStreamObject, ProtocolObject, VideoDecoderObject, PlaybackObject, and UserFeedbackObject. Hereinbelow, an operation for testing video quality and adjusting the video quality will be described using functions.

When the user requests a video quality test and a video quality adjustment, the main application initializes the video management widget application to test and adjust video quality in step S1901. Herein, this step S1901 can be called Initialize( ) API by the video management widget application.

The video management widget application connects to the ProtocolObject to access necessary one or more objects in step S1902 (GetConnection API).

According to a connection request from the video management widget application, the ProtocolObject transmits a connection request to an object, for example, the CVideoStreamObject in step S1903 (RequestConnection API).

The CVideoStreamObject allows the requested connection in step S1904 (AllowConnection API).

When the video management widget application is connected to the CVideoStreamObject via the ProtocolObject, the main application commands the video management widget application to start a video test in step S1905 (StartVideoTest( )API).

Upon receipt of the video test start command from the main application, the video management widget application accesses the ProtocolObject to get a video test stream in step S1906 (GetVideoTestStream API).

The ProtocolObject requests the video test stream to the CVideoStreamObject in step S1907 (RequestVideoStream API).

Then the video management widget application commands playback to the PlaybackObject in step S1908 (Play API).

The PlaybackObject sets the VideoDecoderObject to playback according to the playback command received from the video management widget application in step S1909 (SetPlayback API).

The CVideoStreamObject transmits the requested video test stream to the ProtocolObject in step S1910 (Send API).

The ProtocolObject notifies the video management widget application of the reception of the requested video test stream in step S1911 (NotifyEvent API).

The video management widget application notifies the main application of displaying of the video test stream for a video quality test and adjustment in step S1912 (DisplayMessage( )API).

The main application feeds back, for example, a content selected or set by the user via the main application to the video management widget application in response to the video display notification in step 1913 (SetFeedback( )API).

The video management widget application writes the feedback in the UserFeedbackObject in step S1914 (WriteFeedback API).

The video management widget application adjusts video parameters according to the feedback at the VideoDecoderObject in step S1915 (AdjustVideoParameters( ) API). The VideoDecoderObject continues the video parameter adjustment until receiving an OK command from the video management widget application.

The video management widget application notifies the main application that an adjusted video stream is displayed in step S1916 (DisplayMessage( )API).

The main application transmits a feedback in response to the video display notification to the video management widget application in step S1917 (SetFeedbck( ) API).

In step S1818, the main application sets video coordination concerning the video display notification and transmits a feedback to the video management widget application in step S1918 (SetVideoCoordination( )API).

Then the video management widget application writes the feedback in the UserFeedbackObject in step S1919 (WriteFeedback API).

The video management widget application receives adjusted video settings from the user and reports them to the manufacturer server in step S1920 (Report( )API).

The manufacturer server responds to the video management widget application according to the report in step S1921 (ResponseReport( )API).

After receiving the response from the manufacturer server, the video management widget application writes requested video parameters in the UserFeedbackObject in step S1922 (WriteRecommendationParameters( )API).

The video management widget application adjusts the video parameters again in step S1923 (AdjustVideoParameters( ) API).

The video management widget application notifies the main application that the re-adjusted video stream is displayed in step S1924 (DisplayMessage( )API).

When the video quality is completely adjusted as he wants, the user commands the video management widget application to finish the procedure through the main application in step S1925 (Finalize( )API).

The video management widget application accesses the PlaybackObject and commands the PlaybackObject to discontinue the playback according to a finish command from the main application in step S1926 (Stop( )API).

The PlaybackObject accesses the VideoDecoderObject and sets a playback-related command for the VideoDecoderObject in step S1927 (SetPlayback(int)).

The video management widget application commands the ProtocolObject to disconnect in step S1928 (Disconnect( ) API).

The ProtocolObject commands the CVideoStreamObject to discontinue packet transmission in step S1929 (StopPacket( )API).

Upon receipt of an ACKnowledgement (ACK) message from the CVideoStreamObject, the ProtocolObject notifies the video management widget application of generation of an event in step S1930 (NotifyEvent( )API).

The UserFeedbackObject accesses the video management widget application and reads feedback information from the video management widget application in step S1931 (ReadFeedback( )API).

The video management widget application notifies the main application that the video quality test and adjustment has been completed and a content is displayed in step S1932 (DisplayMessage( )API).

Hereinafter, an exemplary ITF operating the video management widget application will be described in detail.

Figure 20:
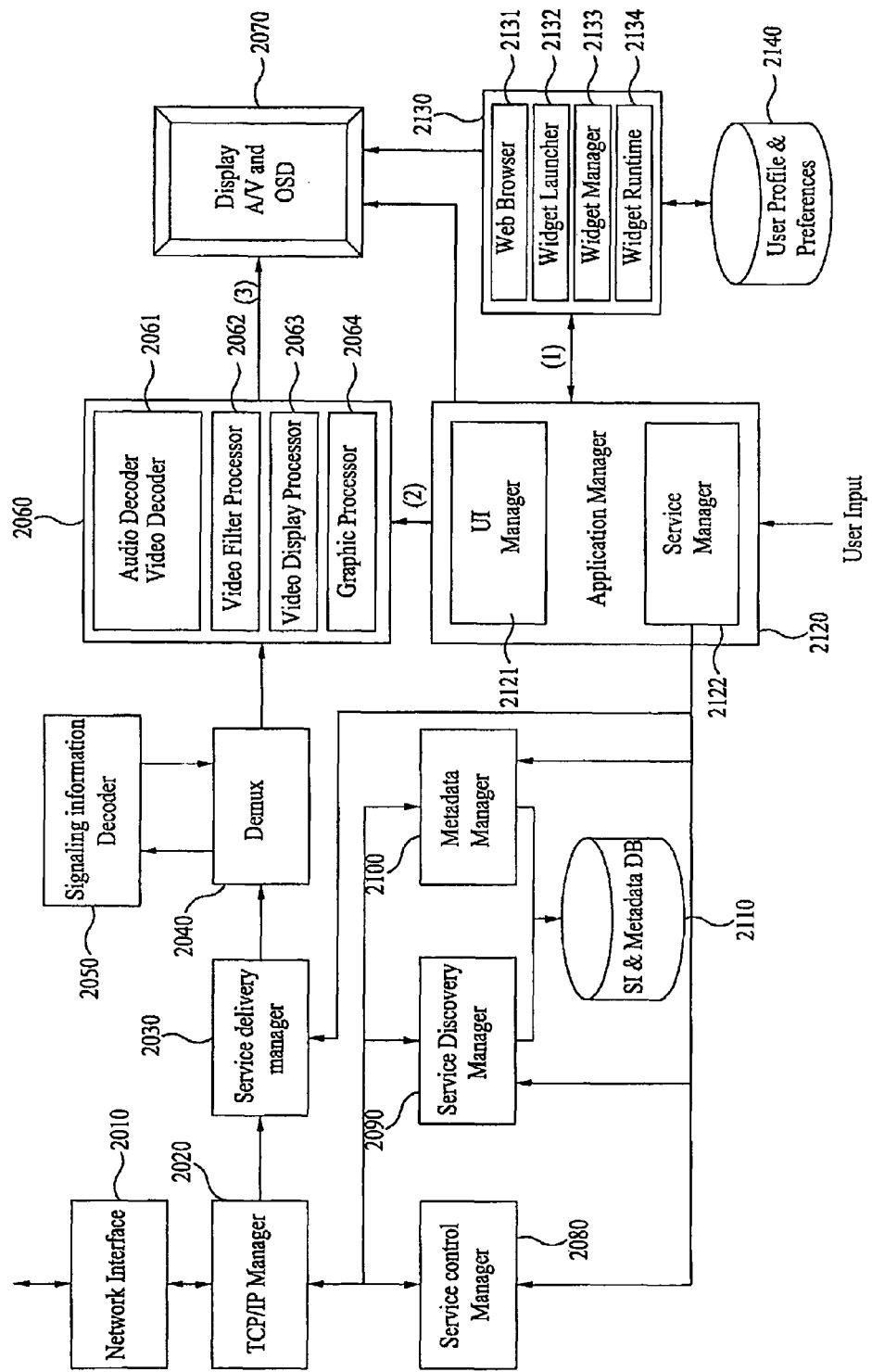
FIG. 20 is a block diagram of an IPTV Terminal Function (ITF) according to an exemplary embodiment of the present invention.

FIG. 20 is an exemplary block diagram of the ITF according to the present invention.

Referring to FIG. 20, the ITF 2000 comprises a network interface 2010, a TCP/IP Manager 2020, a service delivery manager 2030, a Demultiplexer (DEMUX) 2040, a signaling information decoder 2050, an A/V processor 2060, a display unit 2070, a service control manager 2080, a service discovery manager 2090, a metadata manager 2100, an SI & metadata DB 2110, an application manager 2120, a Widget processor 2130, and a user profile & preferences storage 2140.

The network interface 2010 receives and sends IPTV packets. The network interface 2010 connects a network via physical and data link layers.

The TCP/IP manager (or Internet protocol manager) 2020 is responsible for an end-to-end (source-to-destination) packet delivery. The TCP/IP manager 2020 classifies each packet into an appropriate protocol manager.

The service delivery manager 2030 is responsible for handling real-time streaming data and downloading contents. Also, the service delivery manager 2030 is responsible for retrieving contents from a content DB for later consuming (or usage). In this case, a Real-Time Transport Protocol/RTP Control Protocol (RTP/RTCP) may be used with an MPEG-2 TS. MPEG-2 packets are encapsulated in the RTP. The service delivery manager 2030 parses the RTP packets and sends the parsed transport packets to the DEMUX 2040. The service delivery manager 2030 sends a feedback on the network reception quality using the RTCP. The MPEG-2 transport packets may be carried directly in the UDP without the RTP. For content downloading, an HTTP or FLUTE protocol may be used as the delivery protocol.

The DEMUX 2040 demultiplexes audio, video, and Program Specific Information/Program and System Information Protocol (PSI/PSIP) tables from inputted transport packets. In this case, the demultiplexing of the DEMUX 2040 is controlled for PSI/PSIP tables by the signaling information decoder 2050. At this time, the DEMUX 2040 creates the sections of PSI/PSIP tables and sends them to the signaling information decoder 2050. Also, the demultiplexing of the DEMUX 2040 is controlled for A/V transport packets by the A/V processor 2060.

The signaling information decoder 2050 sets Packet Identifier (PID)s for the signaling information (e.g., PSI/PSIP and Digital Video Broadcasting-System Information (DVB-SI) tables) to the DEMUX 2040. The signaling information decoder 2050 decodes the private sections of the PSI/PSIP and/or DVB-SI sent by the DEMUX 2040. The decoding result is used to demultiplex inputted transport packets (e.g., set Audio and Video PID to the DEMUX 2040).

The A/V processor 2060 may include an A/V decoder 2061, a video filter processor 2062, a video display processor 2063, and a graphic processor 2064. The A/V decoder 2061 decodes audio and video (A/V) elementary stream packets. The video filter processor 2062 will process the video filter in all user-selected areas or a whole (or entire) video screen. The video filter processor 2062 may access the video frame buffer memory (not shown) to manipulate or adjust the video or still picture. The video display processor 2063 controls the picture-in-picture (PIP) video and/or the picture-on-picture (POP) video on the display screen. The video display processor 2063 also includes a video scale in the end of MPEG-2 decoder system. The graphic processor 2064 controls the OSD plane on the screen to display a UI menu and notification dialogue messages.

The display unit 2070 receives audio and video data from the A/V Decoder 2061. The display unit 2070 controls video and audio data and displays the data on the screen and through the speaker. The display unit 2070 also controls OSD graphic data.

The Application Manager 2120 may support the graphic user interface (GUI) on the TV screen. The application manager 2120 may receive a user key by a remote controller or a front panel. And, the application manager 2120 may manage the states of the entire TV system.

The service manager 2122 may control all of the other managers related to the services, such as the service control manager 2080, the service delivery manager 2030, an IG-OITF client (not shown), the service discovery manager 2090, and the metadata manager 2100. The service manager 2122 may be responsible for serving IPTV services.

The SI & metadata DB 2110 is a database for service discovery information and metadata related to the services.

The service discovery (SD) manager 2100 may enable the discovery of IPTV services over a bi-directional IP network and may provide all information for selecting the corresponding service.

The service control manager 2080 may be responsible for selecting and controlling services and managing sessions. The service control manager 2080 may select a live broadcasting service, using the Internet Group Management Protocol (IGMP) or Real Time Streaming Protocol (RTSP) protocol. Also, the service control manager 2080 may select VOD contents, using the RTSP protocol. When using the International Measurement System (IMS), a Session Initiation Protocol (SIP) protocol may be used for initiating and managing sessions through the IMS gateway. The RTSP protocol may be used in the controlling of the delivery of broadcast TV and audio as well as for an on-demand delivery. The RTSP protocol may use a persistent TCP connection and allow a trick mode control on real-time media streaming.

The user profile & preferences storage 2140 may keep the user information, all information associated to the widget (installed widget application and active/inactive widget applications), preferences, and the ITF receiver's hardware compatibility and standard profile. The user profile data may be read from a widget launcher 2132, a widget manager 2133, and a web browser 2131, when the user logs into the system or deletes downloaded widget applications.

The widget processor 2130 may include the web browser 2131, the widget launcher 2132, the widget manager 2133, and the widget runtime 2134. The widget launcher 2132 may execute an installed widget application when the user logs in. And, the widget launcher 2132 may execute an activated widget application when the user changes the downloaded widget application. The widget manager 2133 may display all widget applications that can be installed and executed in the ITF. And, the Widget manager 2133 may request downloading of a widget application that the user selected from the servers. Also, the widget manager 2133 may activate/inactivate the downloaded widget application. The widget manager 2133 may delete the downloaded or running widget application (or widget application being played). The widget manager 2133 may control the running widget application and change the location of the widget application within the display screen. The widget runtime framework 2134 may be used for a widget application that calls the predefined module or controls the interface in the ITF. The web browser (declarative application environment: DAE) 2131 may render Hyper-Text Markup Language (HTML) pages on the screen and parse documents according to a W3C specification.

Referring to FIG. 20, major interfaces are given as follows. An interface (1) interfaces between a widget runtime framework 2134 and the application manager 2120. The interface (1) controls mainly functions related to video adjustment and optimization and operates the IPTV receiver in conjunction with functions related to video streams and playback. An interface (2) controls transmission of a setting or a video stream obtained from interfacing with the widget runtime framework 2134 to the A/V decoder 2061. An interface (3) outputs a video test stream on the screen. There are many interfaces for the IPTV set-top box. Therefore, setting information about the interfaces (e.g., HDMI connection, IEEEE1394 connection, Component connection, Composite connection, etc.) may be stored and managed in a user profile & preferences.

As is apparent from the above description, fine video adjustment customized to a user's taste can be performed by use of the video management widget application, in both a stand-alone IPTV receiver and an IPTV set including an IPTV receiver and a display device in combination. Also the user can enjoy moving pictures or images over the Internet Protocol with a desired video quality by use of the video management widget application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claims is:

1. A method of managing a video functionality and a video quality on a screen in an Internet Protocol Television (IPTV) receiver, the method comprising:
    downloading a widget application from a server;
    executing the downloaded widget application at a browser;
    requesting a video test stream through the executed widget application to the server; and
    managing the video functionality and the video quality on the screen using the video test stream.

2. The method of claim 1, wherein the video test stream is received through a connected Internet Protocol in real-time.

3. The method of claim 1, wherein the video test stream is downloaded from the server.

4. The method of claim 1 further comprises receiving a user's input associated with managing video functionality and video quality on the screen.

5. The method of claim 1 further comprising:
    storing the received video test stream; and
    reproducing the stored video test stream.

6. The method of claim 5 further comprises transmitting a result of managing the video functionality and the video quality on the screen to the server.

7. The method of claim 5, wherein the video test stream is used to test a plurality of pattern types, the plurality of patter types including a vertical resolution pattern, a vertical resolution pattern with motion, a vertical resolution with motion and 3:2 pulldown pattern, a colorbar pattern, an overscan and a pixel crop pattern.

8. The method of claim 5 further comprises performing an operation corresponding to the called Application Programming Interface (API), when the executed widget application calls a specific API.

9. The method of claim 5, wherein the video test stream includes a Moving Picture Experts Group-2 (MPEG-2) Transport Stream (TS) or an MPEG-4 TS in order to test video quality.

10. An Internet Protocol Television (IPTV) receiver for managing a video functionality and a video quality on a screen, the IPTV receiver comprising:
    a receiving unit for downloading a widget application from a server;
    a widget processor for executing the downloaded widget application at a browser and requesting a video test stream through the executed widget application to the server; and
    a controller for controlling the video functionality and the video quality on the screen to be managed using the video test stream according to a user's input.

11. The IPTV receiver of claim 10, wherein the widget processor receives the video test stream through a connected Internet Protocol in real-time.

12. The IPTV receiver of claim 10, wherein the widget processor downloads the video test stream from the server.

13. The IPTV receiver of claim 10, wherein the receiving unit receives a request for selecting an area on the screen to test video quality from the user.

14. The IPTV receiver of claim 10 further comprises a storage unit for storing the received video test stream.

15. The IPTV receiver of claim 14, wherein the controller controls the stored video test stream to reproduce.

16. The IPTV receiver of claim 14, wherein the controller controls a result of managing the video functionality and the video quality on the screen to transmit to the server.

17. The IPTV receiver of claim 14, wherein the received video test stream is used to test a plurality of pattern types, the plurality of patter types including a vertical resolution pattern, a vertical resolution pattern with motion, a vertical resolution with motion and 3:2 pulldown pattern, a colorbar pattern, an overscan and a pixel crop pattern.

18. The IPTV receiver of claim 14, wherein when the executed widget application calls a specific Application Programming Interfaces (APIs), the widget processor requests the controller to perform an operation corresponding to the called API.

19. The IPTV receiver of claim 10, wherein the video test stream includes a Moving Picture Experts Group-2 (MPEG-2) Transport Stream (TS) or an MPEG-4 TS in order to test video quality.

* * * * *